United States Patent [19]

Watanabe et al.

[11] Patent Number: 5,432,648
[45] Date of Patent: Jul. 11, 1995

[54] MAGNETIC RECORDING AND REPRODUCING UNIT WITH SELECTION OF REPRODUCED IMAGE SIGNALS

[75] Inventors: Mitsuhiko Watanabe, Fujisawa; Yoshinori Okada, Yokohama; Masahiro Tanaka, Hitachi; Mitsuru Kudo, Katsuta, all of Japan

[73] Assignee: Hitachi, Ltd., Tokyo, Japan

[21] Appl. No.: 41,002

[22] Filed: Mar. 30, 1993

[30] Foreign Application Priority Data

Mar. 30, 1992 [JP] Japan ................. 4-074263

[51] Int. Cl.⁶ ........................................ H04N 5/78
[52] U.S. Cl. ............................. 360/10.3; 360/27; 360/37.1; 360/64; 358/312
[58] Field of Search ............. 360/27, 61, 64, 10.1, 360/10.2, 10.3, 77.01, 77.12, 77.13, 37.1; 358/312, 335

[56] References Cited

U.S. PATENT DOCUMENTS

| | | | |
|---|---|---|---|
| 4,241,365 | 12/1980 | Koda et al. | 360/73 |
| 4,542,418 | 9/1985 | Yoneyama et al. | 360/64 X |
| 4,796,128 | 1/1989 | Takimoto | 360/10.3 |
| 4,914,531 | 4/1990 | Kaaden et al. | 360/64 |
| 5,109,305 | 4/1992 | Ohsawa et al. | 360/64 |
| 5,184,254 | 2/1993 | Kaneko et al. | 360/10.2 |
| 5,359,462 | 10/1994 | Park et al. | 360/64 X |

FOREIGN PATENT DOCUMENTS 2078430  1/1992  United Kingdom .

OTHER PUBLICATIONS

JP59216385 Patent Abstracts of Japan, Toshifumi et al., Magnetic Reproducing Device Apr. 13, 1985 vol. 009085.

Primary Examiner—Andrew L. Sniezek
Attorney, Agent, or Firm—Antonelli, Terry, Stout & Kraus

[57] ABSTRACT

The present invention provides a magnetic recording and reproducing unit of a helical scan type having a slow speed tape running mode in which the speed of running a magnetic tape is slower than that of a standard running mode. The magnetic recording and reproducing unit of the present invention has a pair of azimuth heads of mutually different azimuthal angles which are mutually adjacently disposed on the outer periphery of a rotating cylinder and another pair of azimuth heads of mutually different azimuthal angles which are mutually adjacently disposed at positions symmetrical with the first pair of azimuth heads with respect to a rotating center of the rotating cylinder. Each pair of the two pairs of azimuth heads alternately traces tracks recorded with image signals on a magnetic tape to reproduce the recorded image signals. Further, the magnetic recording and reproducing unit of the present invention has a control head for reproducing from the magnetic tape a control signal which is synchronous with a header position of the recorded tracks, a traced azimuth predicting signal generating unit for generating a predetermined azimuth change over signal in response to the control signal, and a switching unit for selecting one of reproduced image signals from the pair of azimuth heads according to the change over signal in the slow speed running mode.

11 Claims, 19 Drawing Sheets

FIG. 3
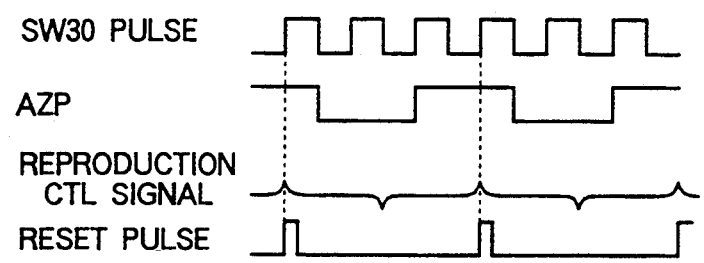
FIG. 4
(HEAD WIDTH : 30μm)
|  | ① | ② | ③ | ④ | ⑤ | ⑥ |
|---|---|---|---|---|---|---|
| SELECTED AZIMUTH | ⊕ | ⊖ | ⊖ | ⊖ | ⊕ | ⊕ |
| TRACED WIDTH (μm) | 19.3 | 17.1 | 19.3 | 19.3 | 17.1 | 19.3 |
FIG. 5
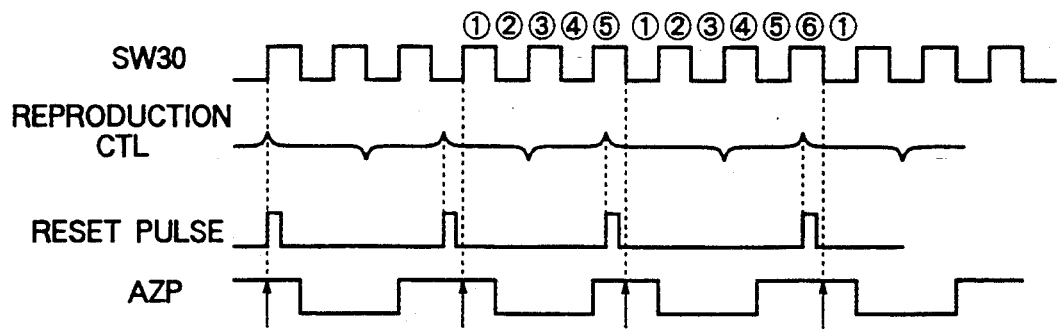

FIG. 7
|  | ① | ② | ③ | ④ | ⑤ | ⑥ | ⑦ |
|---|---|---|---|---|---|---|---|
| SELECTED AZIMUTH | + | − | − | − | + | + | + |
| MAXIMUM DEVIATION | 12.9 | 19.3 | 19.3 | 12.9 | 19.3 | — | — |
| ZERO DEVIATION | 19.3 | 17.1 | 19.3 | 19.3 | 17.1 | 19.3 | — |
FIG. 8
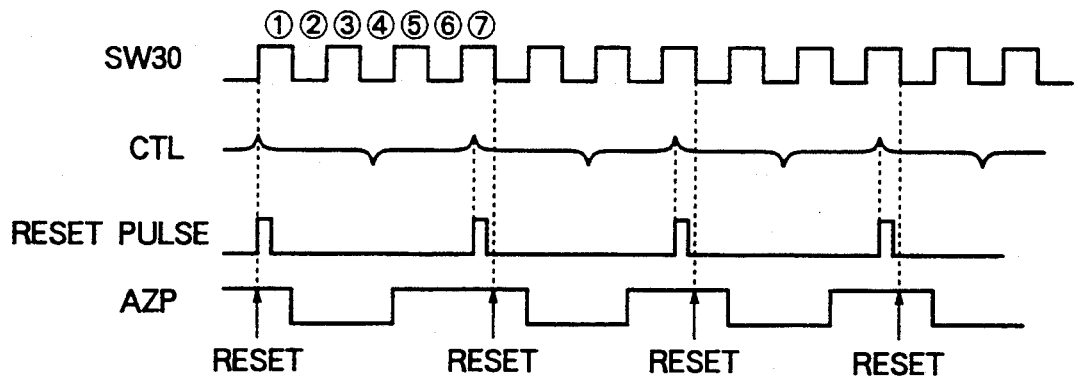
FIG. 9
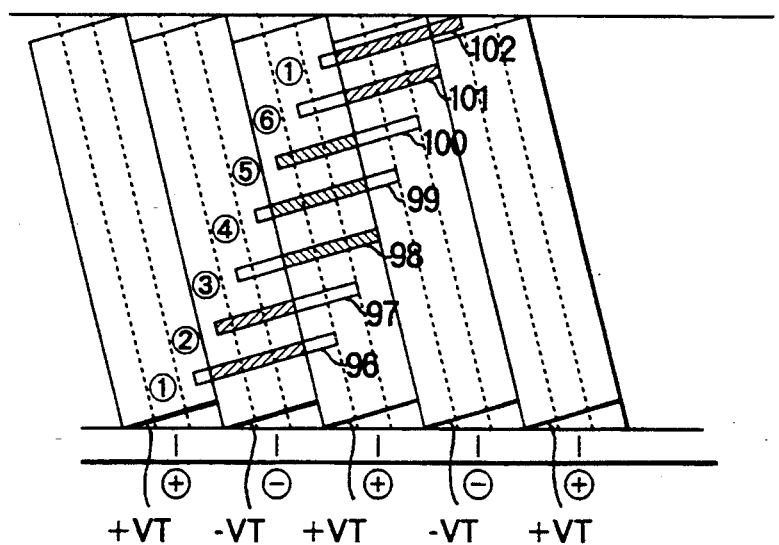

$t_1 = \frac{2}{3} \times 0.5H \qquad t_2 = \frac{1}{3} \times 0.5H$

|  | ① | ② | ③ | ④ | ⑤ | ⑥ |
|---|---|---|---|---|---|---|
| SELECTED HEAD | -A | +B | +A | +B | -A | -B |
| DEVIATION | 0 | -t1 | -t2 | 0 | -t1 | -t2 |

| | ① | ② | ③ | ④ | ⑤ | ⑥ | ⑦ | ⑧ | ⑨ | ⑩ | ⑪ | ⑫ | ⑬ | ⑭ |
|---|---|---|---|---|---|---|---|---|---|---|---|---|---|---|
| SELECTED HEAD | +A | +B | +A | +B | -A | -B | -A | -B | -A | -B | -A | +B | +A | +B |
| DEVIATION | 0 | +t1 | +t2 | +t3 | -t3 | -t2 | -t1 | 0 | +t1 | +t2 | +t3 | -t3 | -t2 | -t1 |

MAGNETIC RECORDING AND REPRODUCING UNIT WITH SELECTION OF REPRODUCED IMAGE SIGNALS

BACKGROUND OF THE INVENTION

The present invention relates to an apparatus for reproducing image signals recorded on a magnetic tape, and relates more particularly to an apparatus having several different modes for running a magnetic tape. According to the present invention, it is also possible to have a unit for recording image signals and audio signals on a magnetic tape.

In recent years, time lapse video tape recorders (VTR) have been widely used which can intermittently record image signals on a normal video tape that is commercially available, such as, for example, the VTR's which can record image signals over 720 hours on one video tape. These VTR's are being used for mainly recording image signals sent from monitoring television cameras at, for example, plants, construction fields, stores, etc. When some abnormal incidence has occurred at these places, it is possible to obtain valuable information by reproducing image signals that have been recorded by these VTR'S.

One example of such a conventional time lapse VTR as mentioned above will be explained in further detail with reference to drawings.

FIG. 24 is a block diagram for showing one example of the conventional time lapse VTR. 7 designates a system control unit that produces a normal mode pulse Ma, a continuous slow mode pulse Mb and an intermittent mode pulse Mc, in a normal mode for running a magnetic tape of the time lapse VTR at a normal speed, a continuous slow mode for running a magnetic tape of the time lapse VTR at the speed of 1/n of the normal running speed (where n is a natural number) and an intermittent mode for intermittently running a magnetic tape respectively. The system control unit 7 also produces an operation mode selecting signal MS for selecting a mode pulse corresponding to any one of the normal driving mode, the continuous slow driving mode and the intermittent driving mode.

20 to 23 designate magnetic heads and 19 designates a rotating cylinder. In the rotating cylinder 19, the magnetic head 23 having a second azimuthal angle is disposed at an angular position of 180 degrees from the position of the magnetic head 20 having a first azimuthal angle, the magnetic head 21 having a second azimuthal angle is disposed adjacent to the magnetic head 20, and the magnetic head 22 having a first azimuthal angle is disposed at an angular position of 180 degrees from the position of the magnetic head 21. The adjacent magnetic heads 20 and 21 and magnetic heads 22 and 23 respectively form double azimuth heads. The rotating cylinder 19 having this structure will hereinafter be referred to as a DA-4 structure cylinder. The first azimuth and the second azimuth will hereinafter be referred to as a plus azimuth and a minus azimuth respectively.

The system control unit 7 produces an SW 30 pulse which discriminates a recording and reproducing period between the period when recording and reproducing is being carried out by keeping the magnetic heads 20 and 21 in contact with a magnetic tape 18 that is run by being wound around the rotating cylinder 19 and the period when recording and reproducing is being carried out by keeping the magnetic heads 22 and 23 in contact with the magnetic tape 18 which is run by being wound around the rotating cylinder 19.

A servo circuit 10 is used for driving a capstan motor 14 and a cylinder motor 15, and this servo motor 10 can change over between the driving modes of these two motors based on an operation mode selecting signal MS. 2 designates an image signal processing unit, 28 designates an aural signal recording and reproducing unit, 11 designates a control (CTL) change over switch for changing over between a recording CTL signal and a reproducing CTL signal, and 12 designates a control unit for controlling recording and reproducing of CTL signals.

5 designates an added vertical synchronizing signal (hereinafter to be referred to as an AVSS) unit, which is structured by an AVSS change over switch 5a for changing over between the case of fitting an AVSS and the case of not fitting an AVSS, an AVSS refitting unit 5a for changing the fitting of an AVSS on behalf of the AVSS in an image signal that has been reproduced, and an AVSS producing unit 5c for producing the AVSS.

4 designates a recording and reproducing control unit, which is structured by a recording circuit 4a, a recording and reproducing change over switch 4b for changing over between a recording time and a reproducing time, a magnetic head change over switch 4c for changing over between the magnetic heads for reproducing images based on the SW 30 pulse, an azimuth change over switch 4d for changing over the reproducing magnetic heads of corresponding azimuthal angle based on an azimuth change over pulse AZP, and an amplifier circuit 4e. 24 designates a CTL head for recording and reproducing a CTL signal, 25 a pinch roller, 26 a capstan, 16 a supply reel, 17 a winding reel, 27 an aural magnetic head for recording and reproducing an aural signal, 28 an aural signal recording and reproducing unit, and 13 an azimuth pulse change over switch for changing over an azimuth change over pulse between AZP' and AZP at the time of the normal and intermittent reproduction driving modes and the continuous slow reproduction driving mode respectively. 29 designate an input terminal for inputting a recording aural signal and 30 designates an output terminal for outputting a reproduced aural signal.

33 designates an azimuth selecting unit, which is structured by comparing and deciding circuits 33b and 33c that decide a larger output that is produced from the magnetic heads 20 and 21 and from the magnetic heads 22 and 23 respectively, and a comparison and decision change over switch 33a for selecting an output from the comparing and deciding circuits 33b and 33c based on the SW 30 pulse. At the time of a continuous slow mode reproduction, the azimuth selecting unit 33 outputs the azimuth change over pulse AZP for selecting always a larger output of the image signal reproduced from a magnetic head out of the magnetic heads of different azimuthal angles of the double azimuth heads, and changes over between the azimuths of the magnetic heads of different azimuthal angles.

A tape guide for winding the magnetic tape 18 around the rotating cylinder 19 and a motor for operating the reels and pinch roller are not shown in the drawings.

With the above-described structure, when a commercially available 120-minute video tape is used, it is possible to achieve a long-time recording, such as, for example, a 2-hour recording in the normal run standard mode of the VHS system VTR (an sp mode, a track width 59 μm), and 24 hours, 120 hours and 480 hours, etc. both in the continuous slow driving mode in which the rotation speed of the capstan motor 13 is dropped and in the intermittent driving mode. Similarly, a long-time recording can also be achieved in a three time long-time mode of the capstan 14 that runs at a speed slower than the speed of the standard sp mode (an EP mode, a track width 19.3 μm).

The operation of the continuous slow driving mode in the time lapse VTR of the above-described structure will be explained below.

When the rotating cylinder 19 of the DA-4 structure rotates, the magnetic heads 20 to 23 sequentially trace the tracks of different azimuthal angles (hereinafter to be referred to as azimuth tracks) on which image signals have been recorded on the magnetic tape 18, and reproduce the image signals. In this case, the +(plus) azimuth head 20 and the—(minus) azimuth head 21 and the +(plus) azimuth head 22 and the —(minus) azimuth head 23 have been disposed mutually adjacent to each other respectively to form double azimuth heads, and image signals are reproduced simultaneously by the mutually adjacent +azimuth head and the—azimuth head from the same track. Output levels of the image signals that have been reproduced simultaneously by the two magnetic heads of different azimuth polarities are compared and judged by the comparing and deciding circuits 33b and 33c respectively. The azimuth change over pulse AZP for selecting a magnetic head of the azimuthal angle of which output is larger than that of the other magnetic head is supplied to the azimuth change over switch 4d. During a continuous slow reproduction mode, a magnetic head of the azimuthal angle with a larger output is always being selected out of the double azimuth heads.

To be more specific, when the +azimuth portion is larger in an azimuth track that is being traced, the +azimuth head is selected automatically. On the other hand, when the—azimuth portion is larger in an azimuth track that is being traced, the—azimuth head is selected automatically. With this arrangement, the magnetic head of the azimuthal angle of which output is larger is always being selected. Accordingly, when a continuous slow reproduction is to be carried out by using a magnetic tape on which signals have been recorded in different recording modes, for example, it is possible to improve the problem of an output deterioration due to a state that the azimuth track can not trace the track correctly (a tracking failure), to thereby obtain a screen image with little tracking noise.

As described above, according to the conventional time lapse VTR, in reproducing an image in a continuous slow mode, an image signal of a larger output has always been selectively produced out of the image signals reproduced by the double azimuth heads. This method, however, has the following drawbacks.

FIG. 25 shows a state that magnetic heads are tracing azimuth tracks to reproduce image signals from a magnetic tape on which the image signals have been recorded in a recording mode other than a continuous slow recording mode. In FIG. 25, +VTa, +VTb and +VTc show +azimuth tracks, —VTa, —VTb and —VTc show—azimuth tracks and 109 to 112 designate magnetic heads which are tracing the azimuth tracks. Since the operating modes are different between the recording time and the reproducing time, the tracks of the magnetic heads for tracing the azimuth tracks are not parallel. In the drawing, an arrow X indicates a direction in which the magnetic tape is proceeding and an arrow Y indicates a direction in which the magnetic heads are tracing the tracks.

Referring to FIG. 25, if a magnetic head starts tracing the tracks in the state as shown by 111, the +azimuth head is selected out of the double azimuth heads and an image signal is reproduced from a right-downward shaded portion. When the tracing is continued to reach the state as shown by 112, the +azimuth head is still kept being selected to achieve a satisfactory reproduction.

On the other hand, when the tracing has started in the state as shown by 109, the output is larger from the +azimuth head at the beginning and therefore the +azimuth head is selected out of the double azimuth heads. However, at the state as shown by 110, the output becomes larger from the—azimuth head and thus the +azimuth head is changed over to the —azimuth head in the middle of the tracing, to reproduce an image from a right-upward shaded portion. This change over is carried out momentarily and the image signal level is always being kept to be large so that no tracking noise occurs.

However, in the middle of tracing an azimuth track, a magnetic head momentarily crosses over an azimuth track to a separate azimuth track and the magnetic head starts reproducing an image signal from the middle of this changed azimuth track. Accordingly, there is a risk that the reproducing timing of a horizontal synchronizing signal is deviated at this moment. At present, a signal processing utilizing an inter-line correlation is being carried out for every one H (where H is a horizontal scanning line) in the color VHS system and color S-VHS system respectively. Accordingly, there has been a problem that a signal processing can not be carried out in a normal condition when a reproduced H timing has deviated, resulting in an occurrence of a color noise in a lateral direction of the screen.

Further, there has been a problem that a screen fluctuation occurs due to a deviation of a synchronizing signal by a few H components at the moment when the track has changed from the +azimuth track to the —azimuth track or vice versa in the middle of the reproduction. In the case of reproducing an image signal in the intermittent reproduction mode, a magnetic head to be selected for the reproduction is known in advance and a magnetic head will not be changed over to a magnetic head of a different azimuthal angle until when the magnetic head has finished tracing one azimuth track. Accordingly, a method for correcting the deviation of H has been taken by adding an added vertical synchronizing signal to a reproduced image signal according to the selection of the magnetic head. However, in the case of reproducing an image signal in the continuous slow mode, it is not firm in advance which one of the magnetic heads of different azimuth angles is to be selected out of the double azimuth heads. Further, it is very difficult to predict a magnetic head to be used and to correct a deviation of H because a magnetic head is changed over to a separate magnetic head of a different azimuthal angle while the magnetic head is being tracing an azimuth track. Accordingly, no correction has been able to be made in the past when reproducing an image signal in the continuous slow mode.

The above problem also occurs when an image signal recorded on a magnetic tape in the continuous slow mode is to be reproduced in the continuous slow mode, or when the azimuth tracks are parallel with the tracks of the magnetic heads. This will be explained with reference to FIG. 26. In FIG. 26, 113 and 114 show magnetic heads which are tracing azimuth tracks.

Referring to FIG. 26, in tracing the azimuth tracks as shown by 113, the +azimuth head is selected to achieve a satisfactory reproduction of an image signal. When image reproduction is continued in this state, the magnetic head is not changed over from one to another magnetic head in the middle of the tracing so that a satisfactory reproduction can be continued. However, in actual practice, a position from which each magnetic head starts tracing each azimuth track is gradually deviated little by little from the other starting points due to a slight gap between the rotation of the capstan motor 14 and the phase of the cylinder motor 15.

As a result, when the same magnetic head comes to trace a half of the +azimuth track and a half of the −azimuth track as shown by 114, the output level of the +azimuth head becomes almost the same as the output level of the −azimuth head, so that both the +azimuth head and the −azimuth head come to be selected alternately in the middle of the tracing of the azimuth tracks due to a slight variation between the rotation of the capstan motor 14 and the rotation of the cylinder head 15. Because of this change of an azimuth head selected, a color noise momentarily occurs on the screen each time when a magnetic head is momentarily changed over to a magnetic head of a different azimuthal angle across the azimuth tracks in the middle of tracing the azimuth tracks. Further, since a track from which an image signal is being reproduced is suddenly changed over to a track of a different azimuthal angle during the reproduction, variation of H occurs by a few H components at the moment when this change has occurred, which results in an occurrence of a fluctuation on the screen. It has also been difficult to correct this deviation of H as described above.

SUMMARY OF THE INVENTION

It is an object of the present invention to provide a magnetic recording and reproducing unit which can eliminate the above-described problems and which can prevent an occurrence of a color noise due to a crossing of a magnetic head across recording tracks, an occurrence of fluctuation of a screen due to a deviation of H, etc. during a reproduction of an image signal from a magnetic tape in the continuous slow reproduction mode.

The present invention provides a magnetic recording and reproducing unit of a helical type having a slow speed tape running mode in which the speed of running a magnetic speed is slower than that of the standard running mode, and this magnetic recording and reproducing unit has a pair of azimuth heads of mutually different azimuthal angles which are disposed adjacent to each other on the outer periphery of a rotating cylinder and another pair of azimuthal heads of mutually different azimuthal angles which are disposed adjacent to each other and these two pairs of azimuth heads are symmetrical with each other with respect to the rotation center of the rotating cylinder, these two pairs of azimuthal heads alternately tracing recording tracks of a magnetic tape to reproduce image signals that are recorded on the magnetic tape. Further, the magnetic recording and reproducing unit of the present invention has a control head for reproducing from a magnetic tape a control signal synchronous with a header position of a recording track, a unit for producing a trace azimuth predicting signal for producing a predetermined azimuth change over signal in response to a control signal, and a switching unit for selecting one of image signals that have been reproduced from a pair of azimuth heads in response to a change over signal in a slow speed running mode.

Further, a magnetic recording and reproducing unit according to the present invention in another aspect has a unit for comparing envelope levels of image signals that have been reproduced from a pair of magnetic heads and detecting a magnetic head of which envelope level is larger than that of the other envelope, and a switching unit for keeping in selecting a reproduced image signal from an azimuth head of which envelope level is larger than that of the other azimuth head during a period while one pair of magnetic heads are scanning recording tracks and until when the scanning by this pair of heads is replaced by a tracing by the other pair of magnetic heads.

BRIEF DESCRIPTION OF THE DRAWINGS

FIG. 3 is a wave form chart for explaining the operation of the unit shown in FIG. 1;

FIG. 4 is a table for showing the widths of tracing by the magnetic heads in the unit shown in FIG. 1;

FIG. 5 is a wave form chart for explaining another operation of the unit shown in FIG. 1;

FIG. 7 is a table for showing widths of tracing by the magnetic heads in the tracing operation shown in FIG. 6;

FIG. 8 is a wave form chart for explaining another operation of the unit shown in FIG. 1;

FIG. 9 is a diagram for showing still another tracing of the track patterns on a magnetic tape by the magnetic heads in the unit shown in FIG. 1;

DESCRIPTION OF THE PREFERRED EMBODIMENTS

Embodiments of the present invention will now be explained with reference to the drawings.

Figure 1:
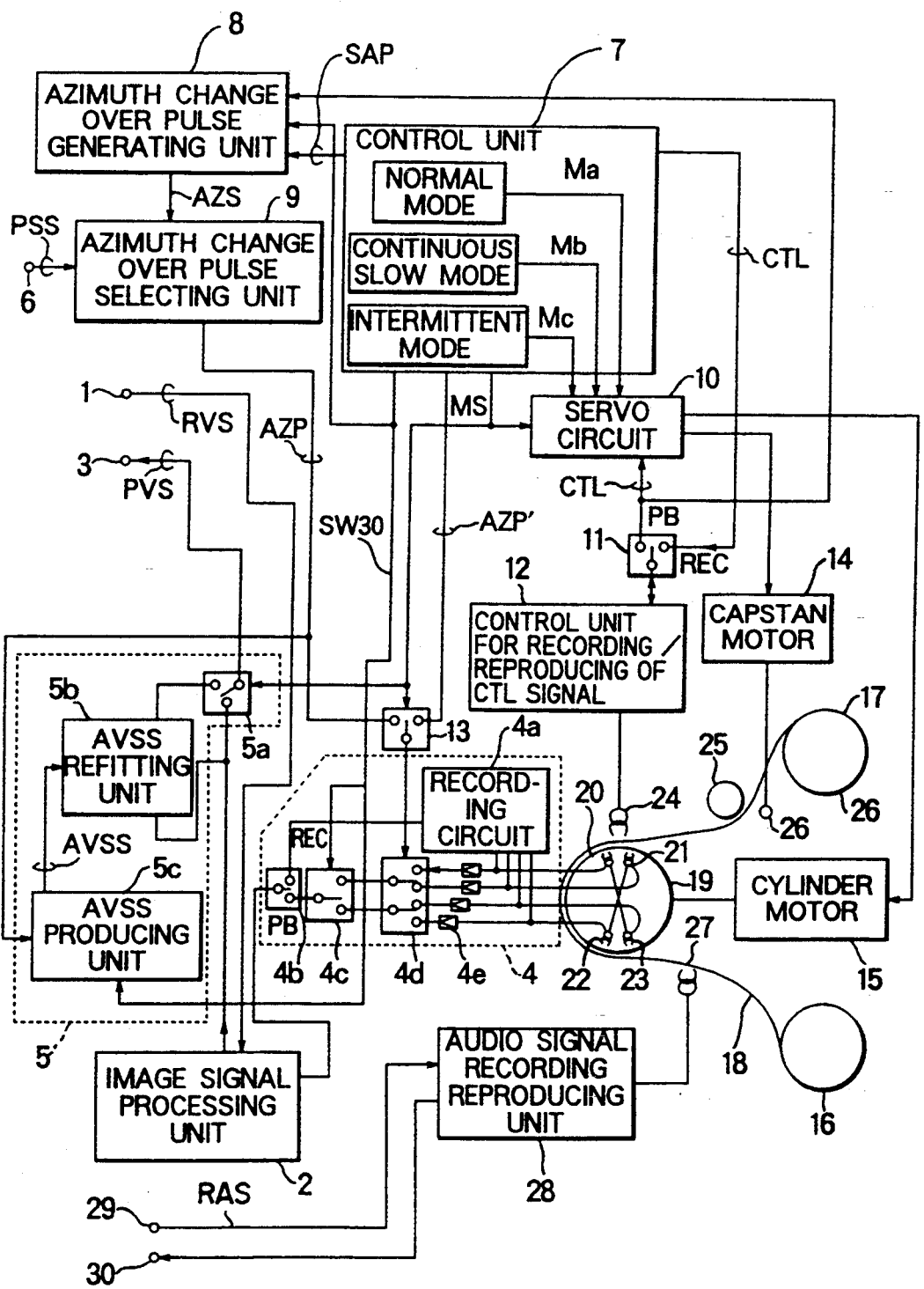
FIG. 1 is a block diagram for showing the intermittent magnetic recording and reproducing unit according to one embodiment of the present invention.

FIG. 1 is a block diagram for showing one embodiment of the intermittent magnetic recording and reproducing unit according to the present invention. Referring to FIG. 1, 1 designates an input terminal, 2 an image signal processing unit, 3 an output terminal, 4 a recording and reproducing control unit, 4a a recording circuit, 4b a recording and reproducing change over switch, 4c a magnetic head change over switch, 4d an azimuth change over switch, 4e an amplifier, 5 an AVSS unit, 5a an AVSS change over switch, 5b an AVSS refitting unit, 5c an AVSS producing unit, 6 an input terminal, 7 a system control unit, 8 a circuit for generating an azimuth change over pulse, 9 a unit for selecting an azimuth change over pulse, 10 a servo circuit, 11 a CTL (control) signal change over switch, 12 a unit for controlling recording and reproducing of a CTL signal, 13 a switch for changing over an azimuth change over pulse, 14 a capstan motor, 15 a cylinder motor, 16 a supply reel, 17 a winding reel, 18 a magnetic tape, 19 a rotating cylinder, 20 to 23 magnetic heads, 24 a CTL head, 25 a pinch roller, 26 a capstan, 27 a magnetic head for sound, 28 an aural signal recording and reproducing unit, 29 an input terminal, and 30 an output terminal. Elements with the same reference numbers as those of the elements shown in FIG. 24 designate the same elements, and explanation of these elements will be omitted.

Figure 24:
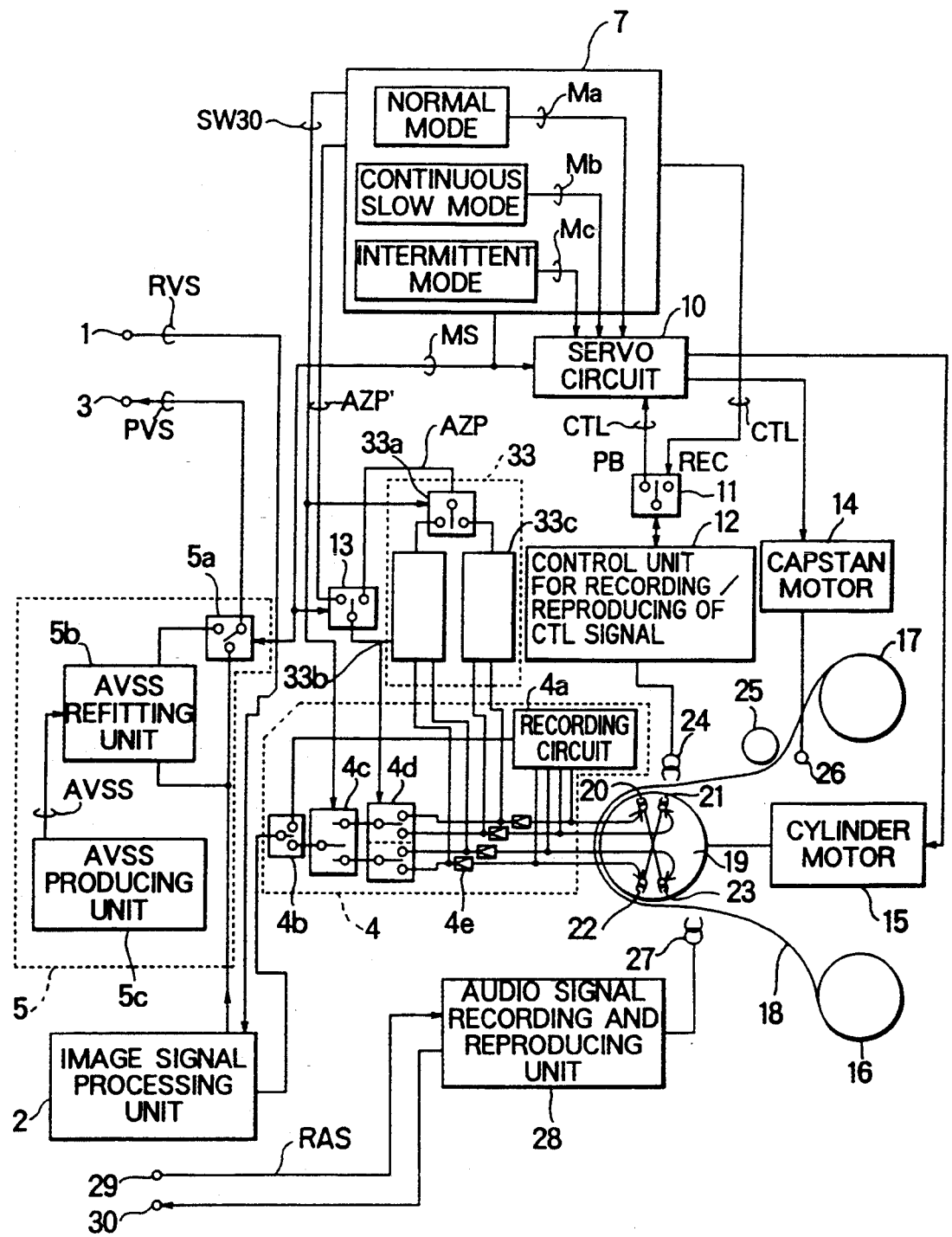
FIG. 24 is a block diagram for showing the intermittent recording and reproducing unit.
Figure 25:
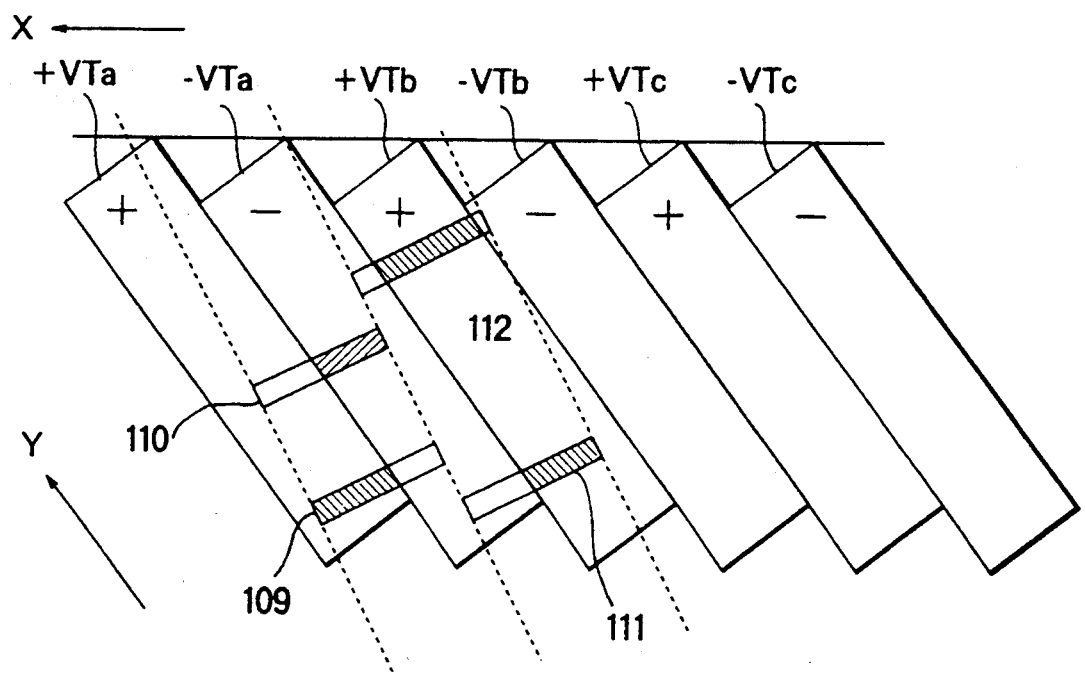
FIG. 25 is a diagram for showing tracing of the track patterns on a magnetic tape by the magnetic heads in the unit shown in FIG. 24.
Figure 26:
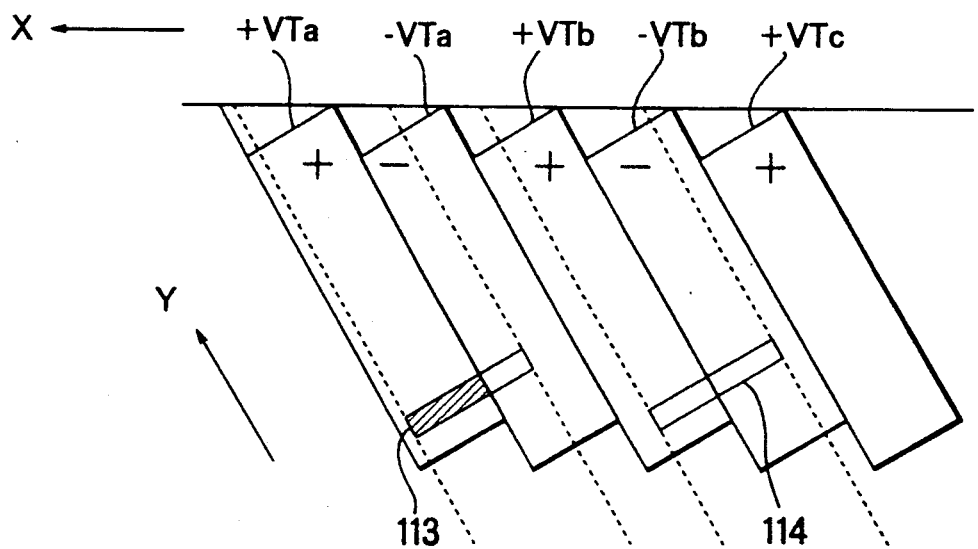
FIG. 26 is a diagram for showing another tracing of the track patterns on a magnetic tape by the magnetic heads in the unit shown in FIG. 24.

FIG. 1 is different from FIG. 24 that shows the conventional time lapse VTR, in that FIG. 1 includes the azimuth change over pulse generating unit 8 and the azimuth change over pulse selecting unit 9 and excludes the azimuth selecting unit 33 in stead.

In the case of driving the magnetic tape 18 at the speed of 1/n of the normal running speed, a continuous slow assigning pulse SAP for assigning a continuous slow mode n is supplied to the azimuth change over pulse generating unit 8 from the system control unit 7. When the azimuth change over pulse generating unit 8 is reset by the reproduction CTL signal from the CTL change over switch 11, the azimuth change over pulse generating unit 8 generates an azimuth change over pulse that has 2n rotations of a continuation of "H" (high level) and "L" (low level) by n times, as one cycle, each one rotation covering the distance from a change over edge of the SW 30 pulse to the next change over edge, and also generates an azimuth change over pulse AZS of n patterns where the sequence of the "H" and the "L" is deviated by one time in each one cycle.

The azimuth change over pulse selecting unit 9 selects one of the n patterns of the azimuth change over pulse AZS that have been generated by the azimuth change over pulse generating unit 8 and produces an output as an azimuth change over pulse AZP, according to a pulse selecting signal PSS sent from the input terminal 6.

The azimuth change over switch 13 changes over an azimuth change over pulse between the azimuth change over pulse AZP sent from the azimuth change over pulse selecting unit 9 and an azimuth change over pulse AZP' sent from the system control unit 7, according to the operation mode selecting signal MS, at the time of the normal and intermittent reproduction driving modes and at the time of the continuous slow reproduction driving mode.

Except the above-described operation, the other operation of the unit of the present embodiment is the same as that of the conventional time lapse VTR.

The operation of the present embodiment will be explained below.

At the time of recording, the following operation is carried out.

An image signal RVS inputted from the input terminal 1 is processed by the image signal processing unit 2 so that the image signal can be recorded on the magnetic tape 18. The image signal RVS is then supplied to the recording and reproducing control unit 4, is passed through the recording and reproducing change over switch 4b and the recording circuit 4a and is then recorded on the magnetic tape 18 by the magnetic heads 20 to 23. In this case, the recording CTL signal is also outputted from the system control unit 7, is supplied to the CTL head 24 through the CTL change over switch 11 and the CTL recording and reproducing control unit 12, and is recorded on the magnetic tape 18 at the same time.

On the other hand, the servo system is operated as follows.

A normal mode pulse Ma, a continuous slow mode pulse Mb and an intermittent mode pulse Mc are supplied to the servo circuit 10 from the system control unit 7, and one of these mode pulses is selected by the operation mode selecting signal MS, so that the capstan motor 14 and the cylinder motor 15 are driven in the selected mode. In the continuous slow mode, a recording of an image signal is carried out by driving the capstan 14 at the speed of 1/n of the speed of the normal mode (a standard running mode and a three-time fast speed mode), and in the intermittent mode, the image recording is carried out by sending the capstan 26 at a predetermined time interval. The aural signal RAS is also inputted from the input terminal 29 and is supplied to the sound head 27 through the sound recording and reproducing unit 28 so that the aural signal is recorded on the magnetic tape 18 at the same time. However, the aural signal RAS can be recorded in only the normal mode and the continuous slow mode and this can not be recorded in the intermittent mode in which the magnetic tape 18 is driven intermittently.

Figure 2:
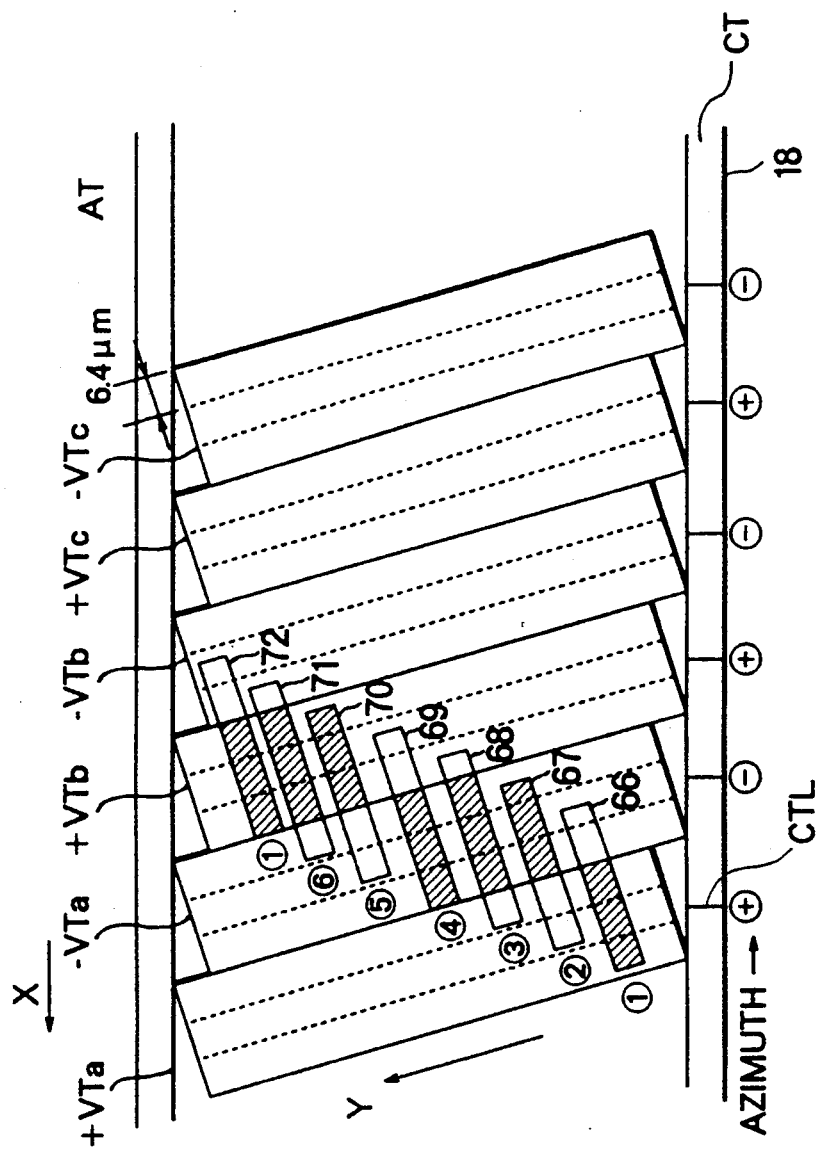
FIG. 2 is a diagram for showing tracing of the track patterns on a magnetic tape by the magnetic heads in the unit of FIG. 1.

A magnetic pattern (tracks) as shown in FIG. 2 is drawn on the magnetic tape 18 on which the above-described recording has been made. Referring to FIG. 2, AT designates a track for recording a sound, +VTa, +VTb and +VTc designate +azimuth tracks, −VTa, −VTb and −VTc designate −azimuth tracks and CT designates a recording track for recording the CTL signal. An arrow X designates a direction in which the magnetic tape 18 is proceeding and an arrow Y designates a direction in which the magnetic heads 20 to 23 are tracing the tracks.

The operation of reproducing signals according to the present embodiment will be explained below. As an example, explanation will be made of the case where the images that have been recorded on the magnetic tape 18 in a continuous slow ⅓ speed mode are reproduced at the same continuous slow ⅓ speed mode, where the capstan motor 14 rotates at the speed of ⅓ of the rotation speed in the EP mode. In VHS-system, the tape speed is 33.33 mm/second in the standard speed mode, and 11.11 mm/second in EP-mode which is one third of the standard speed. In the EP mode, the width of the track is assumed to be 19.3 μm and the width of the tracks of the magnetic heads 20 to 23 is assumed to be 30 μm. In this case, the azimuth pulse change over switch 13 selects the azimuth change over pulse AZP from the azimuth change over pulse selecting unit 9 based on the operation mode selecting signal MS.

Traces of the magnetic heads 20 to 23 on the azimuth tracks +VTa, +VTb, −VTb,—that have been formed on the magnetic tape 18 are shown in FIG. 2. Since the magnetic tape is driven in the same ⅓ slow speed mode for both recording and reproducing of the images, the tracks on the magnetic tape and the tracks formed by the respective magnetic heads become parallel with each other, that is, the magnetic heads are moving along the dotted lines, as shown in FIG. 2. Each magnetic head moves in the lateral direction by every ⅓ of the width of the tracks, or every 6.4 μm, while tracing the magnetic tape 18. When a certain magnetic head 66 has finished tracing the tracks from the bottom upwards according to the SW 30 pulse, a next magnetic head 67 starts tracing the tracks from the position 6.4 μm deviated from the magnetic head 66, as shown in FIG. 2. Accordingly, when the magnetic head 66 starts tracing the tracks in the state that the magnetic head 66 is superposed with the +azimuth track +VTa and the magnetic heads 67 to 71 sequentially trace the tracks after the magnetic head 66, the magnetic heads are changed over in the order of the azimuthal angles of +, −, −, −, , +, +, so that it becomes always possible to reproduce more image signals as shown in the shaded portions in FIG. 2. Based on the above observation, the azimuth change over pulse AZP from the azimuth change over pulse selecting unit 9 for changing over the azimuthal angles of the magnetic heads may be produced in such a way that the "H" appears three times and the "L" appears three times, totalling six changes in one cycle, based on a ½ cycle of the SW30 pulse as a unit, as an overall relation is shown in FIG. 3. In FIG. 3, the reset pulse is the signal generated in the plus polarity of the reproduction CTL signal.

In this case, when the width of the head tracks is 30 μm, the widths over which the magnetic heads are actually tracing the tracks are as shown in FIG. 4. As shown in FIG. 4, the tracing width is always secured by at least 17 μm, and the continuity of the "H" is being secured within one field because the azimuth of the magnetic head will not be changed over in the middle of the tracing, so that a satisfactory reproduced image can be obtained without color noise.

In this case, the CTL signal recorded in the magnetic tape 18 corresponding to an azimuth track is utilized to detect that the magnetic head has come to a predetermined position of the azimuth track in the magnetic tape 18, such as, for example, a position at which the left edge of the +azimuth track and the left edge of the magnetic head are superposed in the case of the magnetic head 66, as shown in FIG. 2. The reproduction CTL signal is fed back to the servo circuit 10 by the CTL recording and reproducing control unit 12 so that the magnetic head can trace the azimuth tracks correctly. As one example, when the magnetic head 66 has come to the position as shown in FIG. 2 at the moment when the reproduction CTL signal has been reproduced, a reset pulse is generated at the timing of the positive polarity of the CTL signal to reset the magnetic head so that the azimuth change over pulse AZP of the "H", "L", "L", "L", "H" and "H" is generated from the azimuth change over pulse selecting unit 9 always in synchronism with the cylinder control. In this way, the widths shown in FIG. 4 can always be secured as the widths over which the magnetic heads trace the azimuth tracks.

Figure 6:
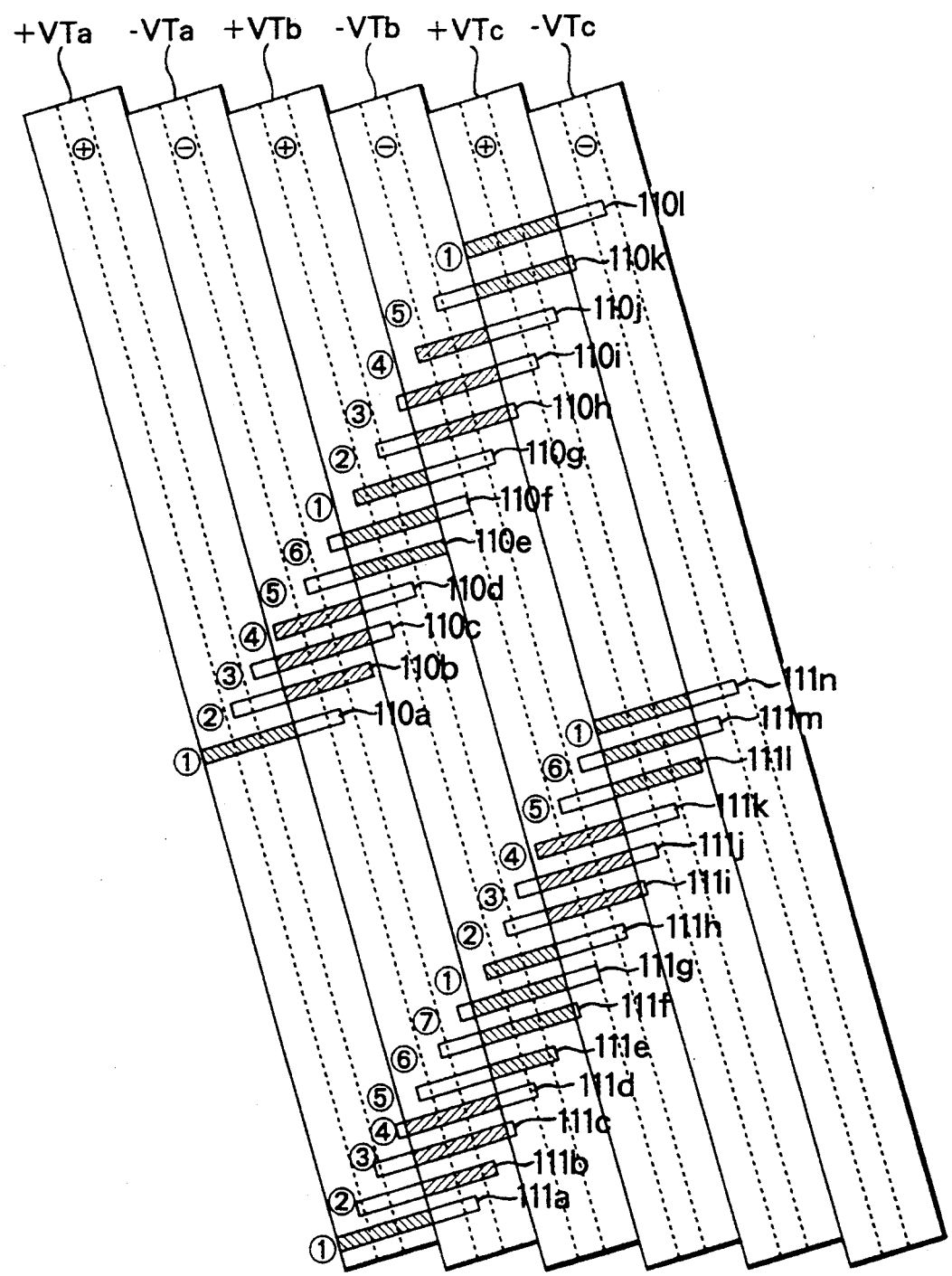
FIG. 6 is a diagram for showing another tracing of the track patterns on a magnetic tape by the magnetic heads in the unit shown in FIG. 1.

On the other hand, when the SW30 pulse for controlling the rotating cylinder 19 is not synchronous with the reproduction CTL signal, that is, when the rotation of the capstan motor 14 is deviated to a slightly higher speed than ⅓ of the rotation speed of the normal EP mode, as shown in FIG. 5, for example, the azimuth change over pulse selecting unit 9 detects the position of the magnetic head by using the reproduction CTL signal and generates always a constant azimuth change over pulse AZP. Therefore, it is possible to correct the deviation and to reproduce always a satisfactory image signal. The relationship between the azimuth tracks and the magnetic heads is shown in FIG. 6, where 110a to 110l designate the positions of the magnetic heads.

When a resetting pulse is produced and the tracing has started from the position of 110a, each of the magnetic heads proceeds tracing by moving a slightly larger distance than ⅓ of the width of the azimuth tracks because the rotation of the capstan motor 14 is slightly faster than ⅓ of the rotation speed of the EP mode. Therefore, the deviation becomes gradually larger as shown in FIG. 6. However, when one cycle has finished as predicted by the magnetic heads 110a to 110f, that is, a cycle of six pulses including the "H", "L", "L", "L", "H" and "H" in the azimuth change over pulse AZP, and a tracing has been continued further, in the next cycle a resetting is applied by this resetting pulse after five levels of the SW30 pulse, so that a state that the +azimuth track and the +VT are superposed correctly is obtained again, as shown by the magnetic head 110i. As a result, even a maximum deviation can be as small as only 6.4 μm 7 as compared with the case of the normal tracing as shown in FIG. 7.

The above also applies to the case where the rotation of the capstan motor 14 is deviated to a slightly slower direction than ⅓ of the rotation speed of the EP mode, as shown in FIG. 8. In this case, since the timing of reproducing the reproduction CTL signal is slow, the deviation can be corrected by counting the SW 30 pulse additionally by one, as shown in one cycle of the magnetic heads 111a to 111g in FIG. 6. In this case, a maximum deviation can also be restricted to around 6.4 μm, as shown in FIG. 7.

As explained above, according to the present embodiment, the azimuth change over pulse selecting unit 9 applies a resetting by using the reproduction CTL signal, to thereby always correct a deviation. Each time when the resetting is applied, the azimuth change over pulse AZP of the "H", "L", "L", "L", "H" and "H" is generated. With this arrangement, the tracing width of 12.9 μm can be secured which is a sufficient tracing width for reproducing an image signal. Thus, always a satisfactory reproduced image can be obtained.

As described above, if the magnetic head is correctly superposed with the +azimuth track when the CTL signal has been reproduced, resetting is applied each time and then the azimuth change over pulse AZP of the "H", "L", "L", "L", "H" and "H" is generated to obtain a satisfactory image.

In the actual time lapse VTR, however, the magnetic head is not always correctly superposed with the +azimuth track even if the reproduction CTL signal has been reproduced because there is a slight variation in the structure. Usually, a position of the magnetic head at the moment the CTL signal has been reproduced is predetermined by the X value. When the recording and reproducing are carried out by the same VTR, the X value will not vary, but when the recording and reproducing are carried out by using different VTR's the X value may vary slightly. This will be explained with reference to FIG. 9.

Referring to FIG. 9, as an example, the magnetic head is located at a position shown by 96 at the moment the reproduction CTL signal has been reproduced, and the tracing is started from this position. In this case, a resetting is applied each time when the CTL signal has been reproduced. When an azimuth change over pulse AZP of "L", "L", "H", "H", "H" and "L" has been generated, the areas to be traced become as shown in the shaded portions in FIG. 9 and the azimuth tracks +VT and −VT are traced satisfactorily.

As explained above, in the case of a positional relationship of the magnetic heads shown in FIG. 9 as compared with the positional relationship between the CTL signal and the magnetic heads shown in FIG. 2, the timings of the "H" and the "L" are deviated in the azimuth change over pulse AZP of the cycle having six pulses including three "H"'s and three "L"'s, for the same SW30 pulse.

Figure 10:
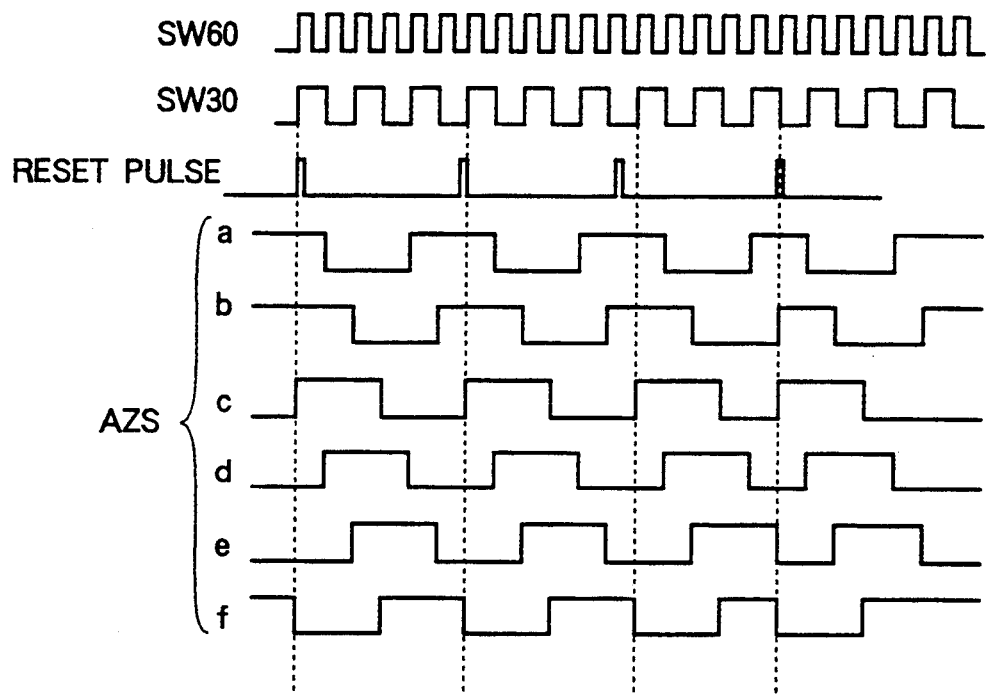
FIG. 10 is a wave form diagram for explaining the operation of the unit for generating an azimuth change over pulse shown in FIG. 1.

FIG. 10 is a diagram for explaining the above. Assume the azimuth change over pulse AZP has been generated by a resetting pulse as shown by a in FIG. 10. The "H" and the "L" levels are deviated one by one by keeping synchronism with the SW30 pulse to generate six patterns of the azimuth change over pulse AZS as shown by b, c, d, e, and f in FIG. 10. By selectively outputting these patterns of azimuth change over pulse AZS, positional errors between the CTL signal and magnetic head, which will arise in assembling a rotation cylinder and the other servomechanism into a video tape recorder, can be corrected.

Figure 11:
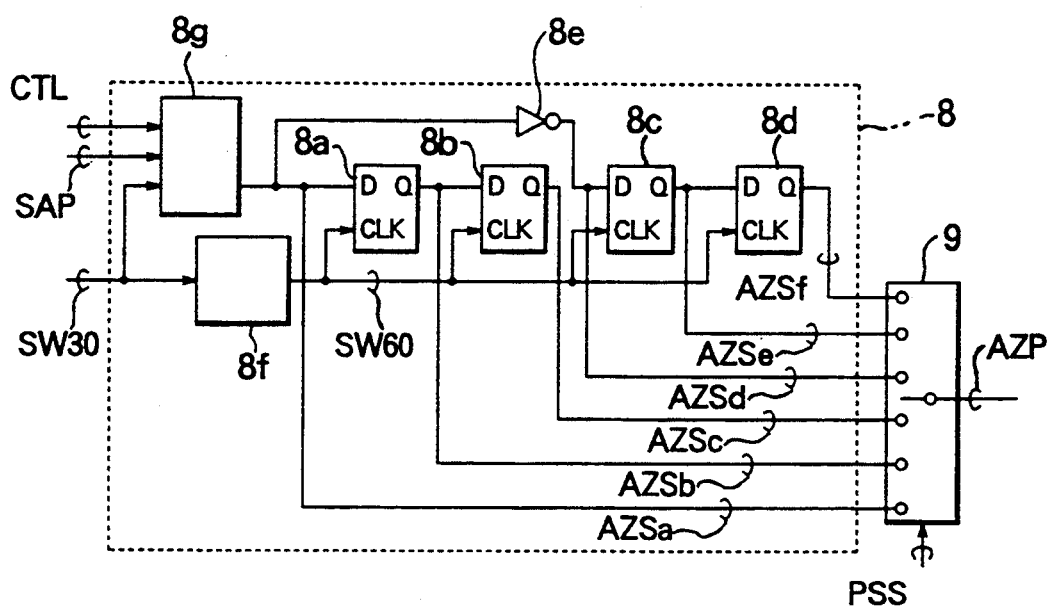
FIG. 11 is a block diagram for showing the unit for generating an azimuth change over pulse shown in FIG. 1.

FIG. 11 is a configuration diagram for showing an example of the azimuth change over pulse generating unit 8 shown in FIG. 1 that generates the six patterns of azimuth change over pulse AZS and the azimuth change over pulse selecting unit 9 that selects one of the six patterns of the azimuth change over pulse AZS as the azimuth change over pulse AZP. In FIG. 11, 8a to 8d designate flip-flops, 8e an inverter, 8f an SW 60 pulse generating circuit for generating an SW 60 pulse that starts at the edge of the SW30 pulse, and 8g a basic pulse pattern generating circuit for generating a basic pulse pattern of the azimuth change over pulse.

Referring to FIG. 11, the basic pulse generating circuit 8g generates an azimuth change over pulse AZSa which becomes a standard azimuth change over pulse based on the reproduction CTL signal, a linked slow assigning pulse SAP and the SW30 pulse. The azimuth change over pulse AZSa is delayed by each one clock cycle by the flip-flops 8a to 8d based on a clock which is the SW 60 pulse generated from the SW30 pulse by the SW60 pulse generating circuit 8f. Azimuth change over pulses AZSb to AZSf are generated from these flip-flops 8a to 8d.

The azimuth change over pulse AZSd is inverted by the inverter 8e to form the azimuth change over pulse AZSd and the azimuth change over pulses AZSe and AZSf are generated from the output of the inverter 8e by the flip-flops 8c and 8d, for the following reasons. If the azimuth change over pulses AZSb to AZSf are the ones that are obtained by sequentially delaying the azimuth change over pulse AZSa by the flip-flops 8a to 8d, a resetting is not applied successfully by the reproduction CTL signal. For example, when the azimuth change over pulse AZSa which has usually six pulses for one cycle for the SW30 pulse has been applied with a resetting after five pulses by the reproduction CTL signal or when a resetting has not been applied after six pulses and there were seven pulses extensively, the resetting by the reproduction CTL signal becomes unsuccessful, resulting in an error.

In accordance with the pulse selecting signal PSS, the azimuth change over pulse selecting unit 9 selectively outputs one of the above-described six patterns of azimuth change over pulses AZSa to AZSf that have been generated by the azimuth change over pulse generating unit 8.

Figure 12:
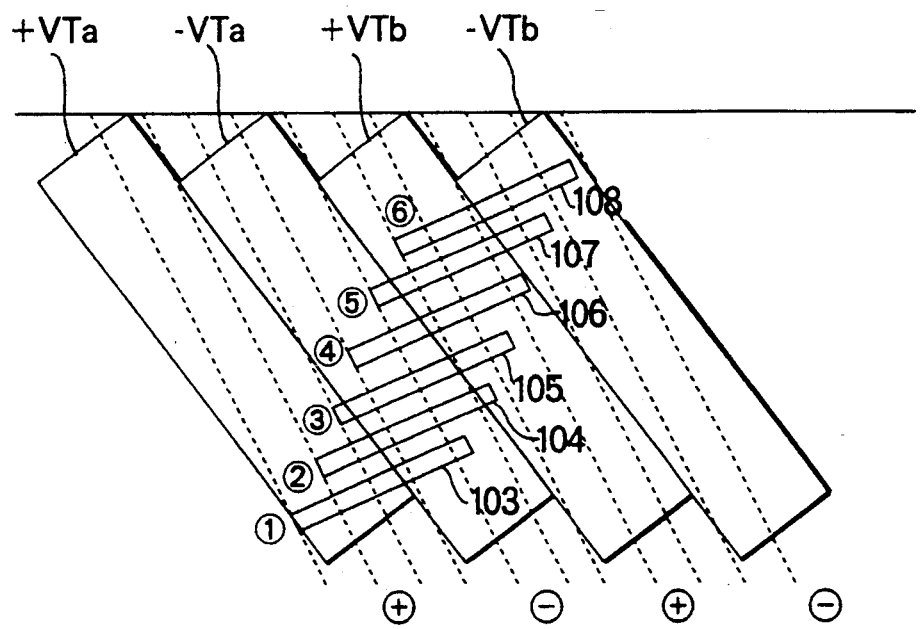
FIG. 12 is a diagram for showing still another tracing of the track patterns on a magnetic tape by the magnetic heads in the unit shown in FIG. 1.

Further, if the azimuth change over pulse can be selectively outputted by the azimuth change over pulse selecting unit 9, the following merits can be enjoyed. This will be explained by taking an example of the case where a signal that has been recorded on the magnetic tape 18 in the mode other than the ⅓ speed of the continuous slow ⅓ speed mode, that is a mode other than the mode in which the capstan motor 14 has been rotated at a speed of ⅓ of the normal EP mode, is reproduced in the continuous slow ⅓ speed mode. FIG. 12 shows azimuth tracks in this case and magnetic heads for tracing these azimuth tracks, where 103 to 108 designate the magnetic heads, and the tracings of these magnetic heads are shown by dotted lines.

Referring to FIG. 12, the azimuth tracks and the tracks of the magnetic heads are not parallel with each other, and therefore, it is necessary to change over magnetic heads of which azimuthal angles are different from each other in the middle of a tracing. However, an attempt to do so brings about an occurrence of a fluctuation in the screen and an occurrence of noise as explained in the section of the prior art technique. Even if a magnetic head has been changed over to a magnetic head of a different azimuthal angle as predicted by the azimuth change over pulse and even if such a change over is not carried out in the middle of the tracing, the magnetic heads 103, 104, 106 and 107 can not reproduce an image signal in the case of a situation shown in FIG. 12, if only the azimuth change over pulse of "H", "H", "H", "L", "L", and "L" is being reproduced, with a result that there occur many tracking noises on the reproducing screen. Further, if the operation mode at the recording time is different from the operation mode at the reproducing time, it is difficult in practice to predict a state for tracing an azimuth track in which a magnetic head has been formed.

Figure 13:
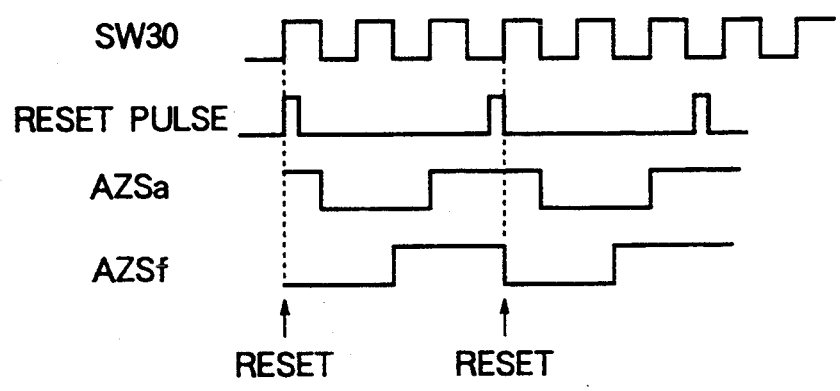
FIG. 13 is a wave form diagram for showing the tracing operation shown in FIG. 12.

Accordingly, when azimuth change over pulses which can trace the azimuth tracks most satisfactorily are selected, such as the azimuth change over pulses AZSa and AZSf as shown in FIG. 13, by the azimuth change over pulse selecting unit 9 according to the operation mode at the recording time, it is always possible to obtain a satisfactory reproduced image with little noise without an influence of a tracking deviation even if image signals are being reproduced in the continuous slow mode from the magnetic tapes of different operation modes at the time of recording.

As described above, when the capstan motor 14 has been driven at the speed of ⅓ of the speed of the normal EP mode, the azimuth change over pulse generating unit 8 can generate an azimuth change over pulse AZP based on the reproduction CTL signal, the SW30 pulse and the continuous slow mode assigning pulse SAP. Further, as explained in FIG. 11, desirable azimuth change over pulses AZSa to AZSf can be generated by delaying the azimuth change over pulse AZP, generated by the basic pulse generating circuit 8g by using the SW30 pulse as the clock, in synchronism with the SW30 pulse by the flip-flops 8a to 8d.

Further, the azimuth change over pulse selecting unit 9 can selectively output the six patterns of the azimuth change over pulse AZS generated by the azimuth change over pulse generating unit 8, based on the pulse selecting signal PSS that is inputted from the outside. With this arrangement, an image signal can be reproduced to obtain always a satisfactory reproduced image even if a set has been deviated or even if a magnetic tape on which signals have been recorded in different recording modes is used to reproduce the signals in the continuous slow reproduction mode.

Description has so far been made of the case of the continuous slow mode where the capstan motor 14 is driven at the speed of ⅓ of the rotation speed in the EP mode in which the width of the tracks is 19.3 μm. It should, however, be noted that the above case is one example of the present invention and the present invention can also be applied to all the cases where the rotation speed of the capstan motor 14 is driven at the rotation speed of 1/n of the standard rotation speed, where n is a natural number. This will be explained with reference to FIG. 14.

Figure 14:
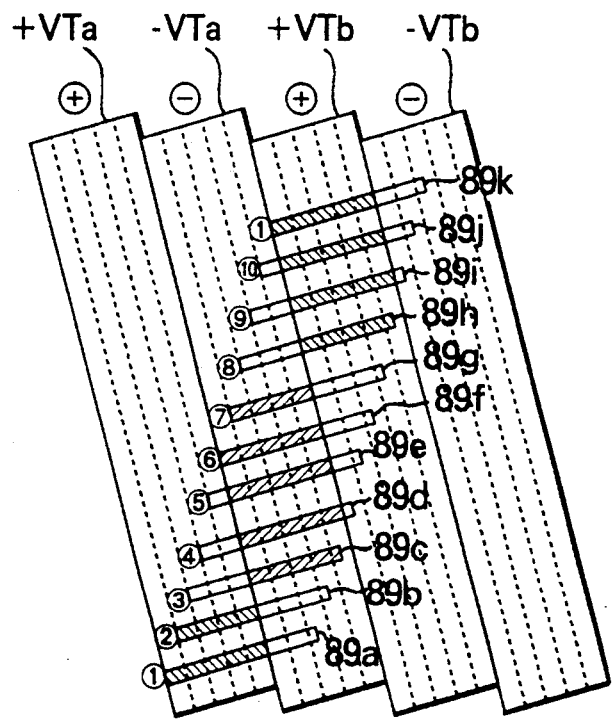
FIG. 14 is a diagram for showing still another tracing of the track patterns on a magnetic tape by the magnetic heads in the unit shown in FIG. 1.

FIG. 14 shows a state of the magnetic heads positioned on the azimuth tracks when the capstan motor is being driven at the speed of 1/5 of the normal rotation speed, where 89a to 89k designate the tracks of the magnetic heads formed on the azimuth tracks.

In FIG. 14, if the magnetic head is positioned at 89a when the reproduction CTL signal has been reproduced, the azimuthal angle is sequentially changed over in the sequence of +, +, −, −, −, −, −, +, + and +, as shown by the shaded portions. A time chart for this case is shown in FIG. 15.

Figure 15:
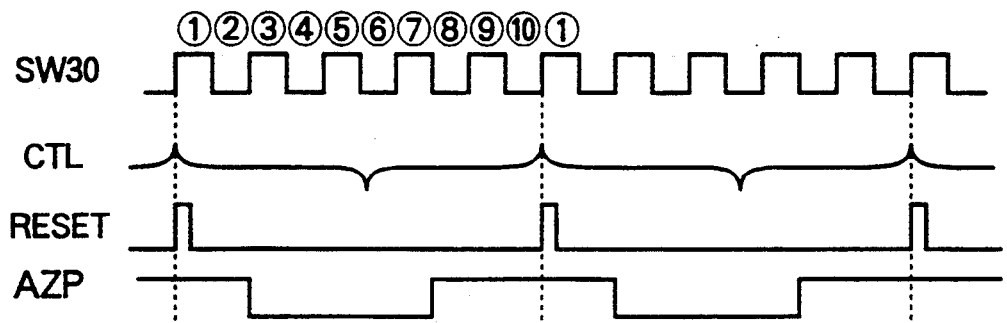
FIG. 15 is a wave form diagram for showing the tracing operation shown in FIG. 14.

Referring to FIG. 15, a resetting pulse is started at the timing the reproduction CTL signal is reproduced and the azimuth change over pulse AZP of +, +, −, −, −, −, −, +, + and + is generated at the edge of the SW30 pulse that follows the starting edge of this resetting pulse. With this arrangement, the magnetic heads trace the azimuth tracks satisfactorily even when the capstan motor 14 has been rotated at the speed of 1/5 of the normal speed, with a result that a satisfactory reproduced image is obtained.

As described above, when the capstan motor 14 has been driven at the speed of 1/n of the normal speed, a resetting is applied by the reproduction CTL signal and, with the period from the starting edge of the SW 30 pulse to the next starting edge as one time, each magnetic head is changed over by the azimuth change over pulse AZP having 2n times in one cycle by continuing the "H" and "L" by n times.

Figure 16:
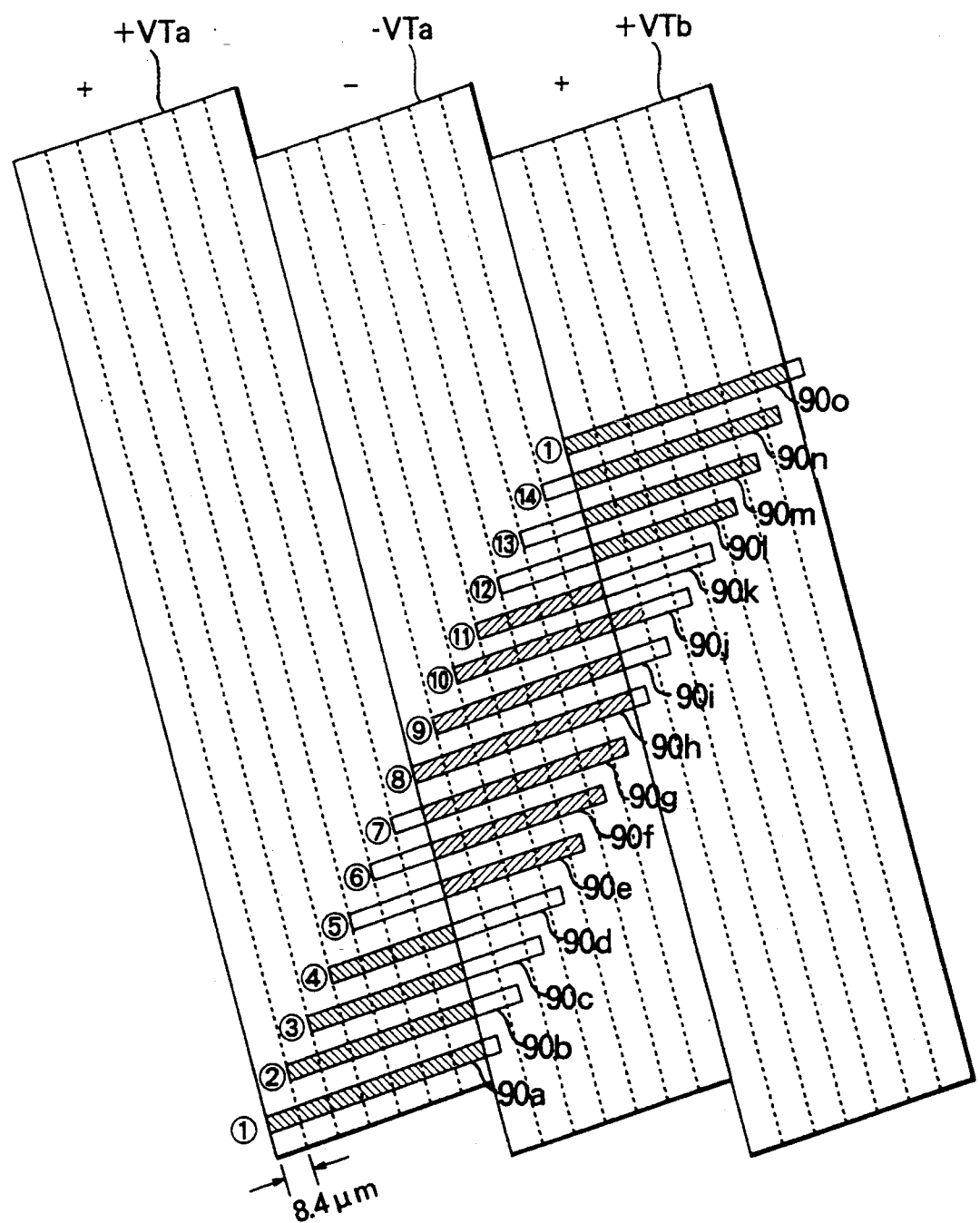
FIG. 16 is a diagram for showing still another tracing of the track patterns on a magnetic tape by the magnetic heads in the unit shown in FIG. 1.

The above also applies to the case where a recording has been carried out in the SP mode with the width of the tracks as 59 μm and the case where a recording has been carried out in the EP mode with the width of the tracks as 19.3 μm. This will be explained with reference to FIG. 16. In this case, it is assumed that signals that have been recorded on the magnetic recording tape in the SP mode are reproduced by rotating the capstan motor 14 at the speed of 1/7 of the speed of the normal SP mode. In FIG. 16, 90a to 90o designate the positions of the magnetic heads on the azimuth tracks and the tracking width of the magnetic heads is assumed to be 64 μm.

Figure 17:
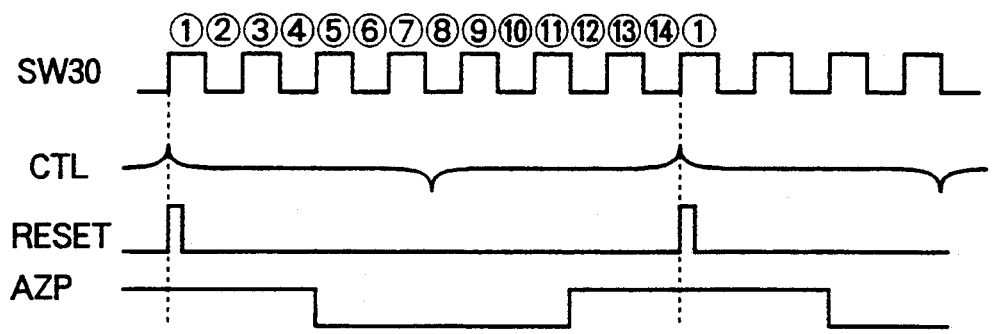
FIG. 17 is a wave form diagram for showing the tracing operation shown in FIG. 16.

In FIG. 16, since the capstan motor 14 is driven at the speed of 1/7 of the SP mode, each time the magnetic head starts tracing after finishing one tracing from the bottom to the top, the position of the magnetic head is deviated by 8.4 μm. In this case, the magnetic head is changed over to have azimuthal angles in the order of +, +, +, +, −, −, −, −, −, −, −, +, + and +, in the same manner as explained for the EP mode. A time chart for this case is as shown in FIG. 17.

A resetting pulse is generated at the reproduction timing of the reproduction CTL signal and the azimuth change over pulse AZP is generated in the order of +, +, +, +, −, −, −, −, −, −, −, +, + and + from the edge of the SW30 pulse immediately after the resetting pulse. As described above, when the capstan motor 14 has been driven at the speed of 1/7 of the speed of the SP mode, a resetting is applied by the reproduction CTL signal and, with the period from the starting edge of the SW30 pulse to the next starting edge as one time, each magnetic head is changed over by the azimuth change over pulse AZP having 14 times in one cycle by continuing the "H" and "L" by 7 times. This method is the same as the one as explained for the case where the recording mode is the EP mode.

Figure 18:
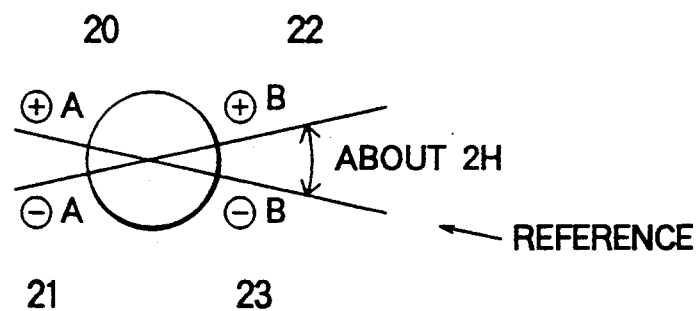
FIG. 18 shows a disposition of double azimuth magnetic heads on the rotating cylinder.

FIG. 18 is a diagram for showing the layout relationship of the magnetic heads 20 to 23 that are fitted to the rotational cylinder 19 of the DA-4 structure.

Referring to FIG. 18, there is a time interval of about 2H (127 μ sec.) between the two magnetic heads that form the double azimuth heads. Assume, for example, a line connecting the magnetic head of the +azimuth (+A head) 20 and the magnetic head of the—azimuth (−B head) 23 as a reference line as shown in FIG. 18. In this case, when the −A head 21 or the +B head 22, each of which is deviated by 2H from the reference line, has been selected, the reproduction of an image signal is delayed by the time of 2H, and this becomes the cause of a fluctuation which occurs in the screen.

In order to solve the problem of this fluctuation in the screen, phases of the vertical synchronizing signals of image signals reproduced by the magnetic heads are adjusted according to the reproducing heads to control so that the positions of the vertical synchronizing signals are all the same for all the image signals that have been reproduced by different reproducing heads. For this purpose, the phases of the AVSS signals added to the image signals reproduced by the magnetic heads 20 and 23 and the phases of the AVSS signals added to the image signals reproduced by the magnetic heads 21 and 22 have a time difference of 2H. Two AVSS signals of different phases are selected by the magnetic heads.

Figure 19:
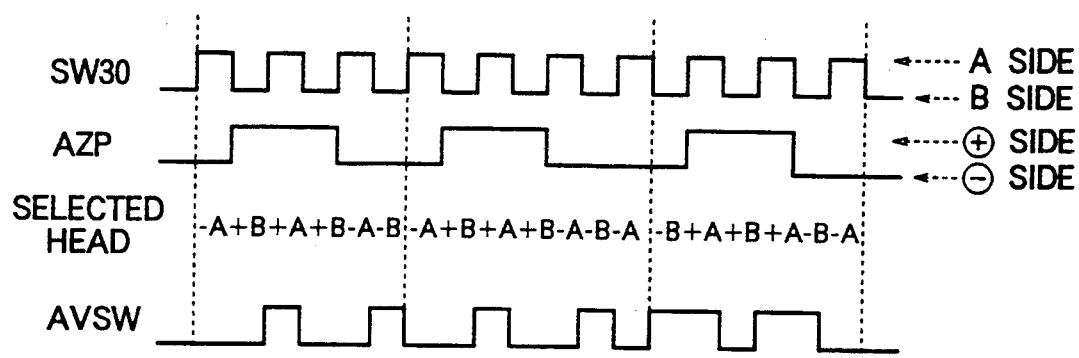
FIG. 19 is a wave form diagram for explaining the operation of the unit shown in FIG. 1 having the magnetic heads shown in FIG. 18.

The magnetic heads of different azimuthal angles are changed over by the azimuth change over pulse AZP as predicted in advance and the azimuth of the magnetic head to be used for the reproduction is decided. Accordingly, as shown in FIG. 19, it is easy to decide which magnetic head is to be selected in the rotating cylinder 19 by using the azimuth change over pulse AZP and SWW 30 pulse 3. With this arrangement, an added vertical synchronizing pulse (AVSS) change over pulse AVSW is generated, and by using this AVSW the AVSS with a time delay of 2H and the AVSS without a time delay are changed over according to the magnetic head to be selected, to thereby replace the vertical synchronizing signal of the reproduced image signal. As a result, a satisfactory screen image without a fluctuation in the screen can be obtained.

Figure 20:
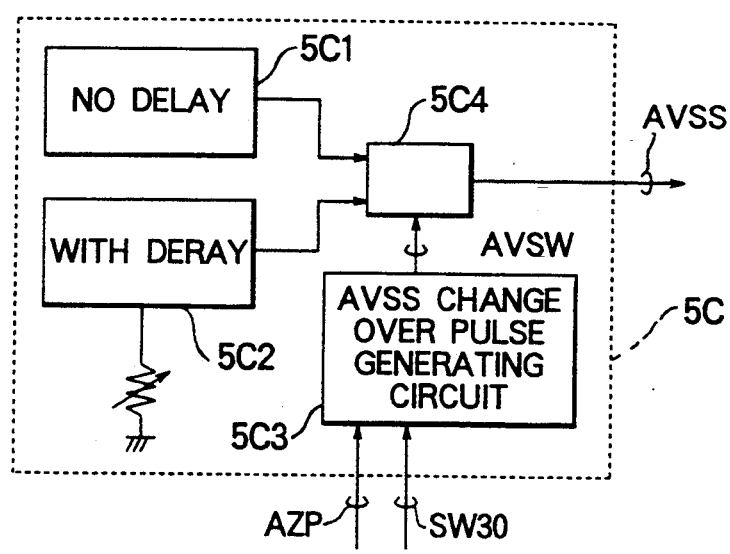
FIG. 20 is a block diagram for showing the inside of the AVSS producing unit.

FIG. 20 is a block diagram for showing one embodiment of the AVSS generating unit which carries out the above-described operation. In FIG. 20, 5c1 designates an AVSS generating circuit without a time delay, 5c2 an AVSS generating circuit with a time delay, 5c3 an AVSS change over pulse generating circuit and 5c4 an AVSS change over circuit.

Referring to FIG. 20, the AVSS change over circuit 5c4 changes over between the AVSS without a time delay that has been generated from the AVSS pulse generating circuit without a time delay 5c1 and the AVSS with a time delay that has been generated from the AVSS generating circuit with a time delay 5c2, based on the AVSS change over pulse AVSW that has been generated from the AVSS change over pulse generating circuit 5c3, and produces an output as the AVSS. The time interval between the two magnetic heads of the double azimuth heads disposed in the rotating cylinder 19 (FIG. 1) is about 2H (127 μ sec.) but this has a variation. In order to fine adjust this variation, the AVSS generating circuit with a time delay 5c2 is provided with a variable resistor for adjusting this time delay.

Figure 27:
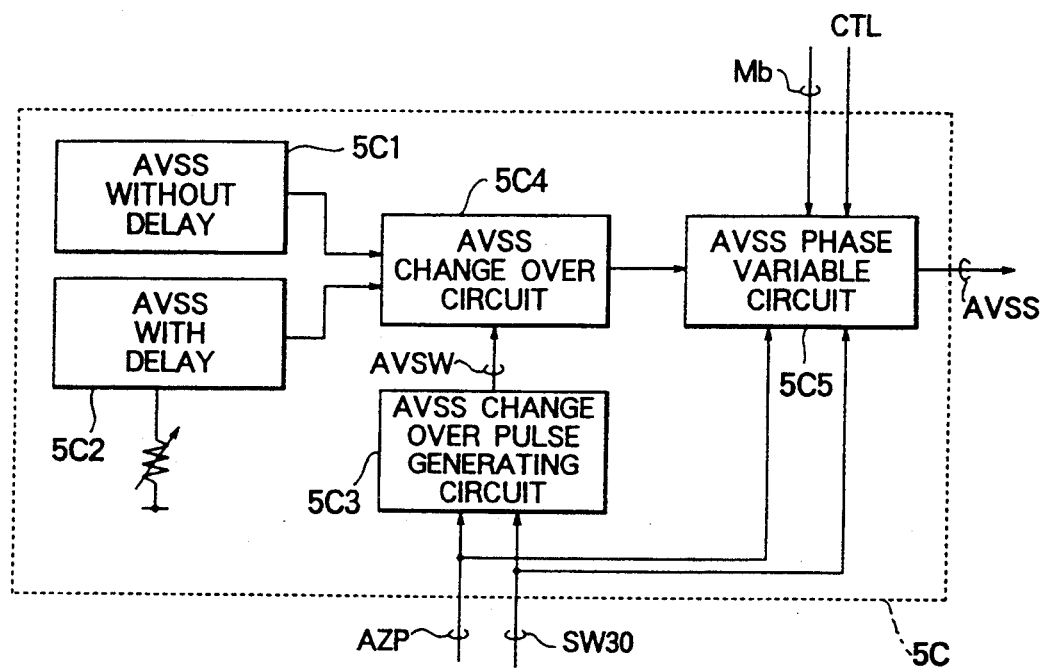
FIG. 27 is a block diagram for showing the inside of the AVSS producing unit according to another embodiment of the present invention.

FIG. 27 shows another embodiment of the AVSS generating unit 5 which can make a further fine adjustment of phases than the AVSS generating unit shown in FIG. 20. Referring to FIG. 27, 5c1 designates an AVSS generating circuit without a time delay, 5c2 an AVSS generating circuit with a time delay, 5c3 an AVSS change over pulse generating circuit, 5c4 an AVSS changing over circuit, and 5c5 an AVSS phase variable circuit for correcting the phases of the AVSS inputted from the AVSS change over circuit 5c4 by a predetermined advanced phase or a predetermined delayed phase based on the SW 30 pulse, AZP and continuous slow mode pulse Mb that have been inputted at the same time and for outputting the AVSS.

The operation of FIG. 27 will be explained below with reference to FIGS. 28 to 30.

Figure 28:
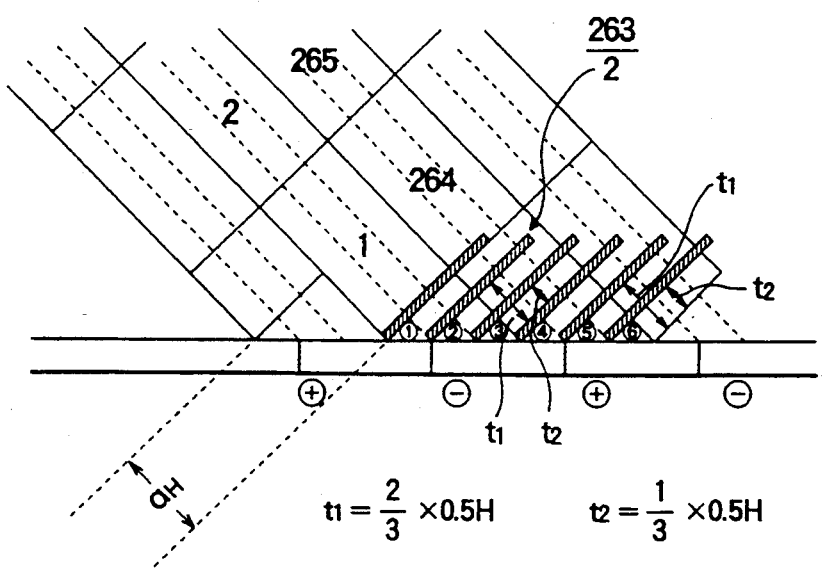
FIG. 28 is a diagram for showing tracing of the track patterns on a magnetic tape by the magnetic heads.

FIG. 28 is a diagram for explaining the state of points at which magnetic heads start tracing the tracks to reproduce signals when the magnetic heads having a tracking width of 30 μm trace a recorded pattern on a magnetic tape on which the signals have been recorded by magnetic heads having the tracking width of 19.3 μm in the same manner as in FIG. 2.

As shown in FIG. 28, since the signals have been recorded in the track width of 19.3 μm (EP mode), there is a distance ($a_H$) of 0.5H between the points where the recording has started in the adjacent tracks. In one track, signals of 1H to 262.5H and 263/2H to 525H have been recorded together with a horizontal synchronizing signal as a border.

Usually in the case of reproducing the signals that have been recorded in the manner as described above, the period Tv between a vertical synchronizing signal and the next vertical synchronizing signal in the reproduced image signals to be read out is 262.5H and therefore the signals are reproduced in a satisfactory manner, because the magnetic heads always trace from the edge of each track, that is the starting point for starting recording.

However, in the case of a continuous slow reproduction, the reproducing operation is carried out as shown in FIG. 28. FIG. 28 shows the case of a continuous slow reproduction. In this case, the magnetic heads are shifted on the magnetic tracks and they start tracing each track starting from the positions as indicated by (1) to (6).

The magnetic head starts tracing the track from the edge of the minus azimuth track when the magnetic head is located at the position of (1), so that there is no deviation of phase of the vertical synchronizing signal in the reproduced image signal. However, when the tracing is started from the position of (2), the magnetic head traces the plus azimuth track as shown in FIG. 28 so that image signal that has been read out becomes shorter by the component shown by t1 in FIG. 28, resulting in an advancing of the vertical synchronizing signal. This is also the same when the tracing starts from the position of (5). Similarly, in the case of starting the tracing from the positions (3) and (6), there is a deviation of t2 between the position from which the magnetic head starts tracing and the minus azimuth track edge as shown in FIG. 28, so that the phase of the vertical synchronizing signal advances in the reproduced image signal due to this deviation. As a result, there occurs a difference in the Tv period of the reproduced image signals, which causes an occurrence of a vertical fluctuation in the monitor screen.

Figures 29, 30:
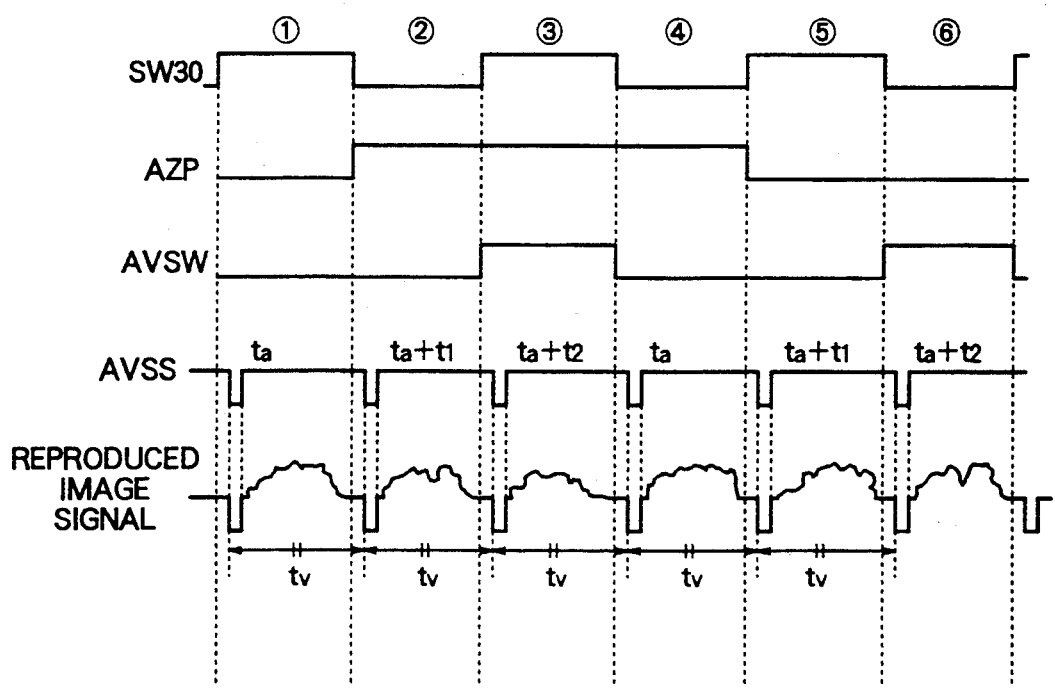
FIG. 29 is a table for showing a deviation of the tracing from the tracks in the operation shown in FIG. 28.
FIG. 30 is a wave form diagram for explaining the operation of the AVSS producing unit shown in FIG. 27.

FIG. 29 is a table which shows levels of such fluctuation as described above. This table shows types of magnetic heads selected from the magnetic heads of the double azimuth structure, and the level of deviation of the trace starting position of the magnetic head from the track edge for the cases of (1) to (6). In the case of the example shown in FIG. 28, the deviations as shown in this table occur.

Such deviations with respect to the changing edge of the azimuth change over pulse AZP proceeds with the following order.

$$-t1 \rightarrow -t2 \rightarrow 0$$

Then, t1 and t2 are as follows:

$$t1 = \alpha H/3 * 2$$

$$t2 = \alpha H/3 * 1$$

where $\alpha H = 0.5H$

In the continuous slow reproduction mode with ⅓-speed of EP mode, the deviation varies by $\alpha H/3$ at each edge of SW30 pulse with respect to the changing edge of the azimuth change over pulse AZP. The deviation amount is fixed value at each trace. The deviation can be easily corrected to be zero by compensating with the fixed amount.

In order to correct these deviations, the AVSS phase variable circuit 5c5 is provided as shown in FIG. 27.

With this arrangement, the phase variation that occur due to the deviation of the magnetic head from the track edge at the starting of the trace as shown in FIG. 29 are calculated for each case based on the continuous slow mode pulse, the SW30 pulse and the AZP, so that the phase deviation can be corrected by inversely varying the phase of only the level of the phase deviation.

FIG. 30 is a diagram for explaining the above. Assuming the timing of the AVSS of (1) having no deviation at the SW30 edge is expressed as ta, the phase is advanced by t1 in the case of (2), so that the AVSS is added by delaying the phase by t1. Similarly, in the case of (3), since the phase is advanced by t2 due to the deviation the AVSS is added by delaying the phase by t2. The similar correction is carried out for the cases of (4), (5) and (6). With this adjustment, the period Tv from the AVSS of the reproduced image signal to the next AVSS can be set to be the same for all the cases.

In this way, satisfactory images can be obtained without a vertical fluctuation in the screen when the images are reproduced in the continuous slow mode.

Figures 31, 32:
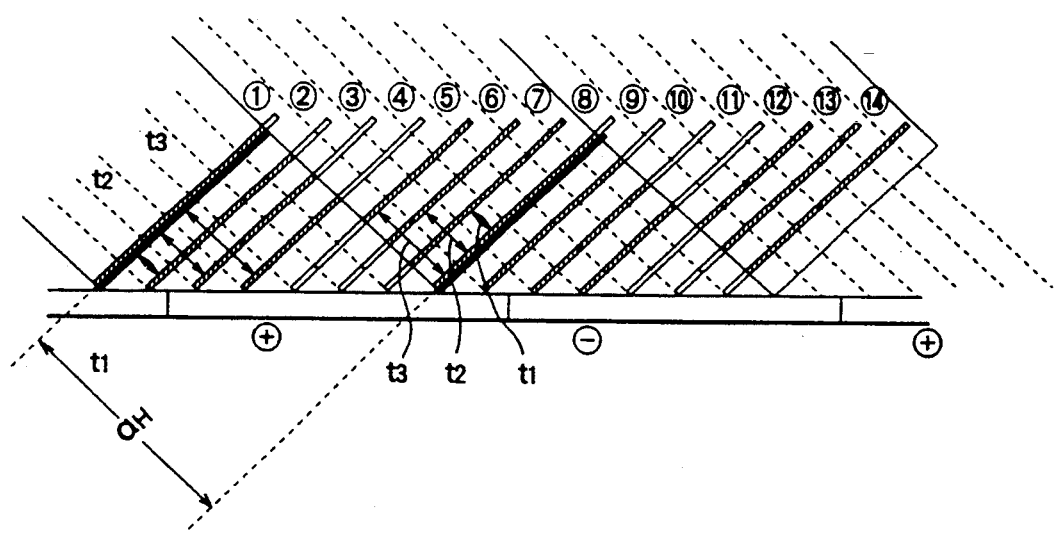
FIG. 31 is a diagram for showing tracing of the track patterns on a magnetic tape by the magnetic heads.
FIG. 32 is a table for showing a deviation of the tracing from the tracks in the operation shown in FIG. 31.

FIG. 31 is a diagram for explaining the case of reproducing images in the continuous slow mode by rotating the capstan at the speed of 1/7 of the normal driving speed.

The magnetic heads proceed on the magnetic tape by every 1/7 of the track width as shown by (1) to (14). In this case, a deviation occurs between the point of starting the tracing for reproduction and the edge of the recording track and a fluctuation similar to the one as explained above occurs in the screen.

The deviations are shown in FIG. 32. Magnetic heads are selected for (1) to (14) and the deviations t1 to t6 occur as shown in FIG. 32. Such deviations with respect to the changing edge of the azimuth change over pulse AZP proceeds with the following order.

$$-t3 \rightarrow -t2 \rightarrow -t1 \rightarrow 0 \rightarrow +t1 \rightarrow +t2 \rightarrow +t3$$

Then, t1 to t2 are as follows:

$$t1 = \alpha H/7 * 3$$

$$t2 = \alpha H/7 * 2$$

$$t3 = \alpha H/7$$

In the continuous slow reproduction mode with 1/7-speed to EP mode, the deviation varies by $\alpha H/7$ at each edge of SW30 pulse with respect to the changing edge of the azimuth change over pulse AZP. The deviation amount is fixed value at each trace. The deviation can be easily corrected to be zero by compensating with the fixed amount.

In the same manner as explained above, the phase deviations that occur due to the deviations from the track edge as shown in FIG. 32 are calculated for each case based on the continuous slow mode pulse, the SW30 pulse and the AZP, so that the phase deviation can be corrected by inversely varying the phase of only the level of the phase deviation. As a result, reproduced images can be obtained satisfactorily without fluctuations in the screen.

Above described embodiments concerns to the continuous slow reproduction with 1/n-speed of EP mode. However, the present invention can also applied to the continuous slow reproduction with 1/n-speed of the standard speed mode.

Figure 21:
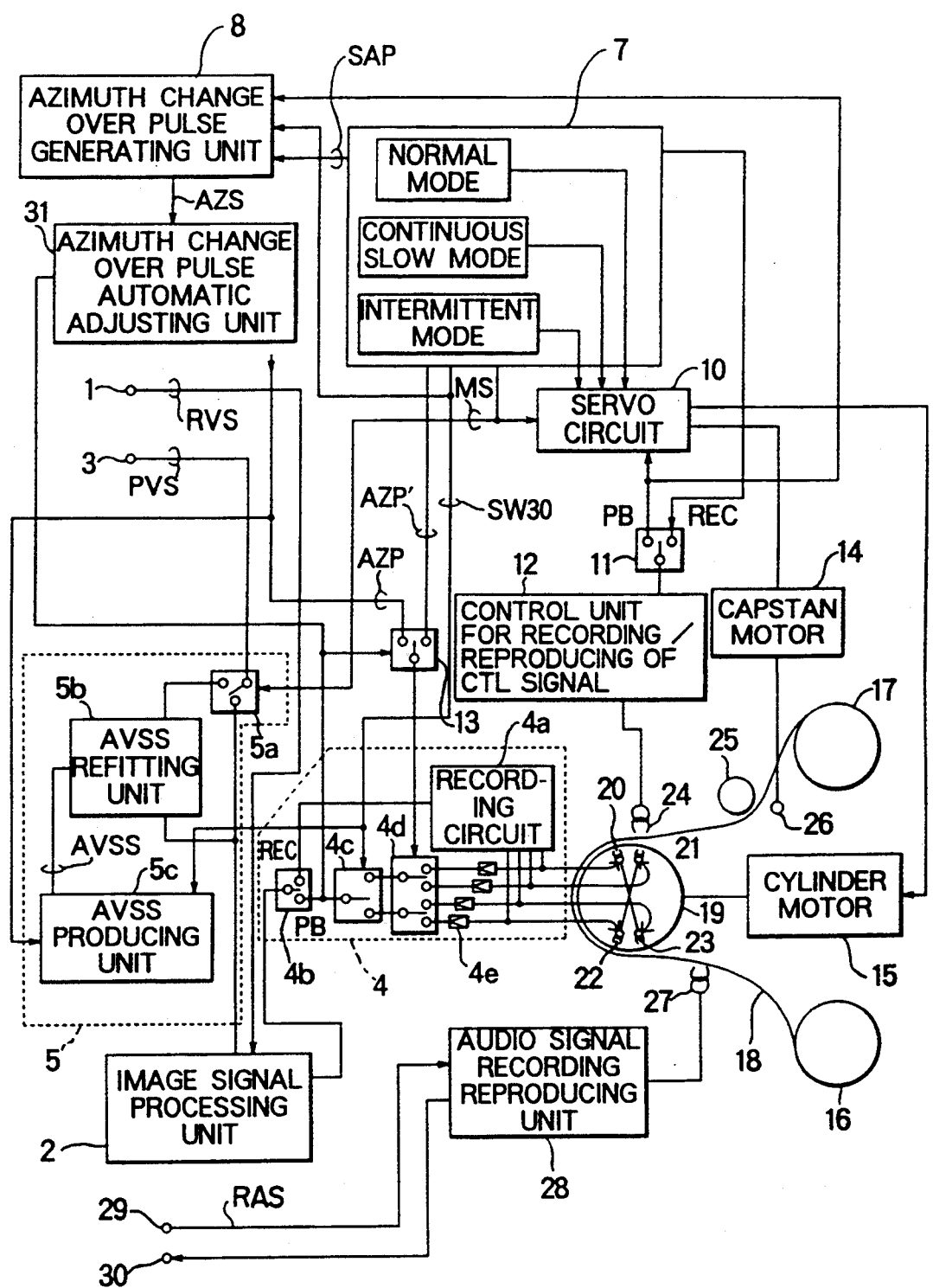
FIG. 21 is a block diagram for showing the intermittent magnetic recording and reproducing unit according to another embodiment of the present invention.

FIG. 21 is a block diagram for showing another embodiment of the intermittent magnetic recording and reproducing unit according to the present invention, where 31 designates an automatic adjusting unit for adjusting an azimuth change over-pulse. In FIG. 21, portions corresponding to those in FIG. 1 are attached with the same reference numbers and their repeated explanation will be omitted.

Referring to FIG. 21, the azimuth change over pulse automatic adjusting unit 31 detects and decides a level of an envelope signal EVS, that is outputted from the image signal processing unit 2, of the image signal that has been reproduced from the magnetic tape 18, and produces a pulse selecting signal and selects one of the azimuth change over pulse AZS and outputs the selected signal as an azimuth change over pulse AZP, if the detected envelope level is not satisfactory and the image signals have not been reproduced satisfactorily.

Figure 22:
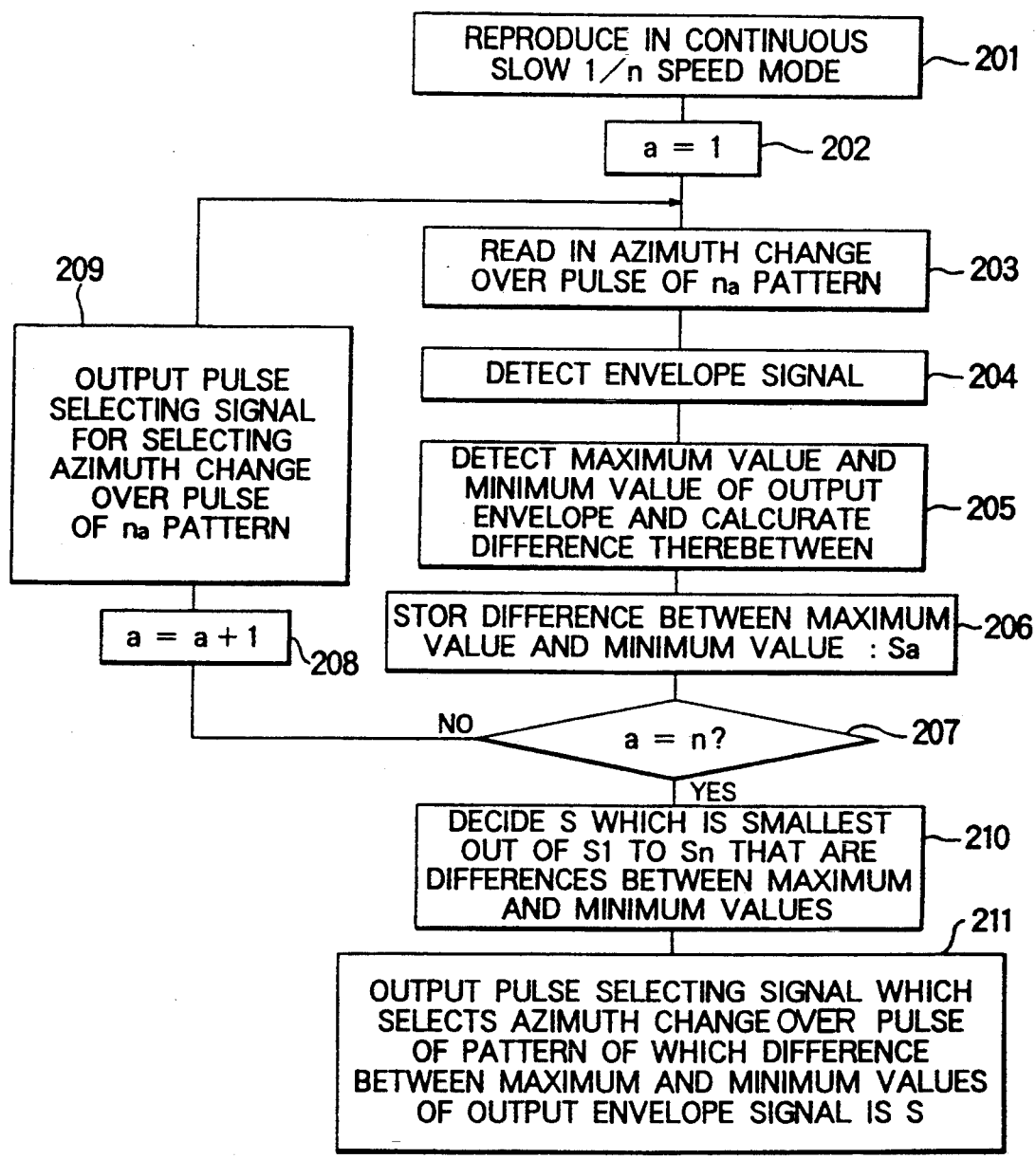
FIG. 22 is a flow chart for explaining the operation of the unit shown in FIG. 21.

Next, the operation of this embodiment will be explained with reference to FIG. 22.

Image signals are reproduced in the continuous slow mode by driving the capstan motor 14 at the speed of 1/n of the speed of the normal mode. At first, image signals are reproduced from the magnetic tape 18 by changing over the azimuth change over switch 4d based on the azimuth change over pulse AZS of na=n1 (a=1) pattern that has been produced by the azimuth change over pulse generating unit 8 (Step 203). The envelope signal EVS of the reproduced image signal is detected (Step 204) and this envelope signal EVS is supplied to the azimuth change over pulse automatic adjusting unit 31 and a maximum value and a minimum value of this envelope signal EVS are detected. Then the difference between the maximum value and the minimum value is obtained (Step 205) and the difference obtained is stored as a difference value S1 (Step 206). Then the azimuth change over pulse automatic adjusting unit 31 sequentially and selectively changes and outputs n2 (a=2) pattern to nn (a=n) pattern of the azimuth change over pulse AZS that are outputted from the azimuth change over pulse generating unit 8, detects a maximum value and a minimum value of the envelope signal EVS that are obtained for each pattern and stores the differences as difference values S2 to Sn.

After the n patterns of difference values S1 to Sn have been stored (Steps 202 to 209), the smallest difference value Smin is selected (Step 210). The azimuth change over pulse AZS of which the difference between the maximum value and the minimum value of the envelope signal EVS becomes the difference value Smin is selected and outputted (Step 211).

The fact that the difference between the maximum value and the minimum value of the envelope signal EVS is small means that the magnetic head is tracing the azimuth tracks almost in a satisfactory manner even if the magnetic head is in any one of the timings of the SW30 pulse. In other words, it is possible to obtain images satisfactorily without a tracking deviation in this case.

With the above-described arrangement, the azimuth change over pulse AZS can be automatically selected so that the reproduced images are in the most satisfactory condition. Thus the operator is not required to select one of the azimuth change over pulse AZS by changing over the azimuth change over pulse AZS by himself to obtain reproduced images in a satisfactory condition when reproducing the recorded image signals from the magnetic tape in the continuous slow mode, to thereby significantly facilitate the operation of the operator.

Figure 23:
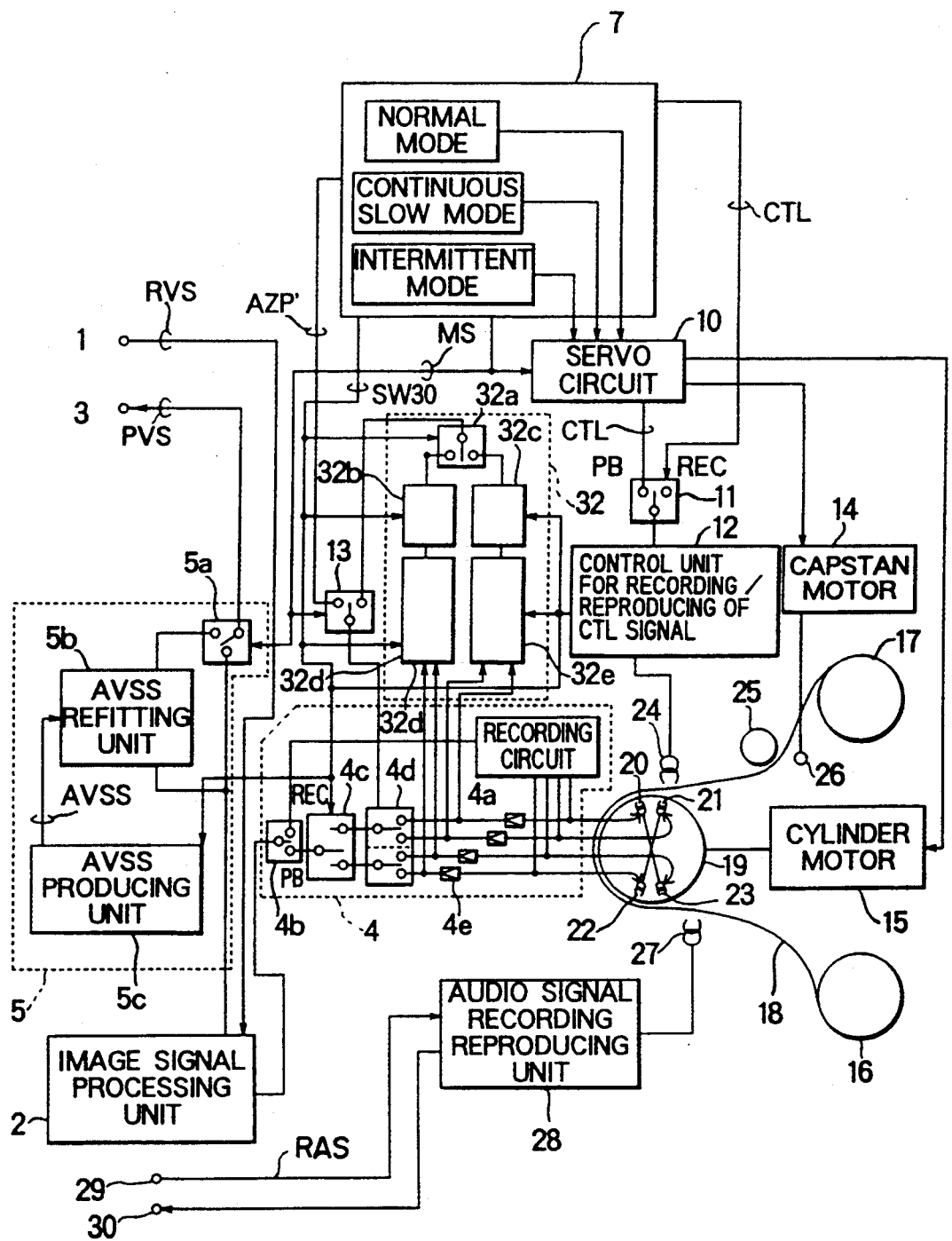
FIG. 23 is a block diagram for showing the intermittent magnetic recording and reproducing unit according to still another embodiment of the present invention.

FIG. 23 is a block diagram for showing still another embodiment of the intermittent recording and reproducing unit according to the present invention. In FIG. 23, 32 designate an envelope comparing azimuth holding unit, 32a a change over switch, and 32d and 32e comparing and deciding circuits. Those portions which correspond to the portions in FIG. 1 are attached with the same reference numbers and their repeated explanation will be omitted.

In the present embodiment, the envelope comparing azimuth holding unit 32 is used in stead of the azimuth change over pulse generating unit 8 and the azimuth change over pulse selecting unit 9 that are shown in FIG. 1.

In FIG. 23, the envelope comparing azimuth holding unit 32 is structured by a comparing and deciding circuit 32d for comparing the envelope levels of the image signals that have been reproduced from the magnetic tape 18 by the magnetic heads 22 and 23 and deciding a magnetic head of the azimuth head of the larger envelope level, a comparing and deciding circuit 32e for comparing the envelope levels of the image signals that have been reproduced from the magnetic tape 18 by the magnetic heads 20 and 22 and deciding a magnetic head of the azimuth head of the larger envelope level, holding circuits 32b and 32c for holding the respective decision results of the comparing and deciding circuits 32d and 32e between the edges of the SW30 pulse and for generating an azimuth change over pulse for changing over the magnetic head to a magnetic head of the azimuthal angle corresponding to the result of decision that has been held, and a change over switch 32a for changing over the azimuth change over pulses that have been outputted from the holding circuits 32b and 32c based on the SW 30 pulse.

The operation of the present embodiment will be explained below.

Referring to FIG. 23, in reproducing the image signals in the continuous slow mode, when the double azimuth heads start tracing the azimuth tracks on the magnetic tape 18, the envelope levels of the image signals that are to be reproduced by the magnetic heads are detected by the comparing and deciding circuits 32d and 32e in the envelope comparing azimuth holding unit 32. The operation is carried out as follows. The time during which the double azimuth heads are tracing the azimuth tracks is predetermined by the edge of the SW pulse 30 so that the tracing is started from the edge of the SW30 pulse and the tracing ends at the next edge.

However, in actual practice, the magnetic heads are already in contact with the magnetic tape 18 before the timing of the edge of the SW30 pulse and it is possible to reproduce the image signals before the occurrence of the edge of the SW30 pulse. Accordingly, before the image signals are reproduced after the edge of the SW30 pulse has occurred, the envelope levels of the image signals are detected at the portion where the magnetic heads are already in contact with the magnetic tape 18 and they are compared by the comparing and deciding circuits 32d and 32e, and the larger envelope levels are decided and held in the holding circuits 32b and 32c. The holding circuits 32b and 32c keep holding the magnetic heads of the larger azimuthal angles that have been decided during the period from the edge of the SW30 pulse to the next edge and output the azimuth change over pulse for changing over the magnetic head to the magnetic head of the azimuth that has been held. The magnetic head is selectively changed over by the change over switch 32a and the selected magnetic head is outputted.

With the above-described arrangement, a magnetic head which is in the middle of the tracing of azimuth tracks will never be changed over to a magnetic head of a different azimuthal angle, so that the conventional problem of the occurrence of the color noise can be eliminated. Further, since only the block portion of the azimuth selecting circuit is required to be changed as compared with the conventional unit, the unit of the present invention can be provided at a low cost.

As explained above, according to the present invention, when signal images are reproduced in the continuous slow mode by driving the capstan at the speed of 1/n of the speed of the normal running mode while reproducing aural signals by the aural signal recording and reproducing unit, it is possible to prevent the occurrence of noise due to a color signal processing error that is incurred by the change over of the azimuth of the double azimuth heads in the middle of the tracing of the azimuth tracks, fluctuations in the screen due to a lack of horizontal scanning period and noise due to a tracking deviation, to thereby obtain reproduced images of satisfactory picture quality.

Further, according to the present invention, when signal images are reproduced in the continuous slow mode while reproducing audio signals by the audio signal recording and reproducing unit, it is possible to obtain reproduced images in satisfactory picture quality, by selectively changing over patterns of the azimuth change over pulse even if the signals are reproduced from the magnetic tape in the capstan driving mode which is different from the capstan driving mode when the images were recorded on the magnetic tape.

Further, according to the present invention, when signal images are reproduced in the continuous slow mode while reproducing audio signals by the audio signal recording and reproducing unit, envelope levels of the reproduced image signals are detected to select an azimuth change over pulse of which difference between the maximum value and minimum value is the smallest. Therefore, the operator does not need to watch the monitoring screen to select by himself the azimuth change over pulse to obtain the most satisfactory reproduced image having no noise, and reproduced images of the most satisfactory picture quality without tracking noise can be obtained automatically.

Further, according to the present invention, when signal images are reproduced in the continuous slow mode while reproducing aural signals by the audio signal recording and reproducing unit, before starting the reproducing of image signals by starting the tracing of azimuth tracks from the edge of the SW30 pulse, the envelope levels of the image signals are detected from the respective magnetic heads of the double azimuth heads that have already been in contact with the magnetic tape and the image signals are reproduced by holding the selection of the magnetic head of the larger level. Accordingly, it is possible to prevent the occurrence of noise due to errors in color signal processing that arise by the change over, in the middle of the tracing of the azimuth tracks, of a magnetic head from one to the other magnetic head that has a different azimuthal angle, fluctuations in the screen due to a lack of horizontal scanning period and noise due to a tracking deviation, to thereby obtain reproduced images of satisfactory picture quality.

What is claimed is:

1. A magnetic recording and reproducing unit of a helical scan type having a slow speed tape running mode in which the speed of running a magnetic tape is slower than that of a standard running mode, comprising;

a pair of azimuth heads of mutually different azimuthal angles which are mutually adjacently disposed on the outer periphery of a rotating cylinder and another pair of azimuth heads of mutually different azimuthal angles which are mutually adjacently disposed at positions symmetrical with said pair of azimuth heads with respect to a rotating center of said rotating cylinder, each of said two pairs of azimuth heads alternately tracing tracks recorded with image signals on a magnetic tape to reproduce said recorded image signals;

a control head for reproducing from said magnetic tape a control signal which is synchronous with a header position of said recorded tracks;

traced azimuth predicting signal generating means for generating a predetermined azimuth change over signal in response to said control signal, wherein said traced azimuth predicting signal generating means has a plurality of change over patterns of mutually different phases and has selecting means for selecting said change over patterns from the outside and outputting a selected pattern as said change over signal; and switching means for selecting one of reproduced image signals from said pair of azimuth heads according to said change over signal in said slow speed running mode;

wherein the running speed of said slow speed running mode is different from the running speed at the time of recording image signals, and wherein when the running speed of said slow speed running mode is 1/n of the running speed of said standard running mode (where n is a natural number other than zero), said change over signal is a signal having 2n as one cycle, and said switching means alternately select reproduced image signals from said pair of azimuth heads based on said change over signal in 2n cycle of said signal.

2. A magnetic recording and reproducing unit of a helical scan type having a slow speed tape running mode in which the speed of running a magnetic tape is slower than that of a standard running mode, comprising:

a pair of azimuth heads of mutually different azimuthal angles which are mutually adjacently disposed on the outer periphery of a rotating cylinder and another pair of azimuth heads of mutually different azimuthal angles which are mutually adjacently disposed at positions symmetrical with said pair of azimuth heads with respect to a rotating center of said rotating cylinder, each of said two pairs of azimuth heads alternately tracing tracks recorded with image signals on a magnetic tape to reproduce said recorded image signals;

a control head for reproducing from said magnetic tape a control signal which is synchronous with a header position of said recorded tracks;

traced azimuth predicting signal generating means for generating a predetermined azimuth change over signal in response to said control signal, wherein said traced azimuth predicting signal generating means has a plurality of change over patterns of mutually different phases and sequentially uses said plurality of change over patterns as said change over signal to select reproduced image signals from said pair of azimuth heads;

switching means for selecting one of reproduced image signals from said pair of azimuth heads according to said change over signal in said slow speed running mode;

means for detecting envelope levels of said selected reproduced image signals;

means for detecting a maximum value and a minimum value for each of said envelope levels;

means for calculating a difference between said maximum value and minimum value for each case of said plurality of said change over signals; and means or deciding said change over signal for obtaining a reproduced image signal of which difference between said maximum value and minimum value is the smallest;

wherein the running speed of said slow speed running mode is different from the running speed at the time of recording image signals, and wherein when the running speed of said slow speed running mode is 1/n of the running speed of said standard running mode (where n is a natural number other than zero), said change over signal is a signal having 2n as one cycle, and said switching means alternately select reproduced image signals from said pair of azimuth heads based on said change over signal in 2n cycle of said signal.

3. A magnetic recording and reproducing unit of a helical scan type having modes in different running speeds of a magnetic tape, comprising:

a first pair of azimuth heads having mutually different azimuth angles, which are mutually adjacently disposed on the outer periphery of a rotating cylinder;

a second pair of azimuth heads having mutually different azimuth angles, which are mutually adjacently disposed at positions symmetrical with said first pair of azimuth heads with respect to a rotating center of said rotating cylinder, each of said first and second pairs of azimuth heads alternately tracing tracks recorded with image signals on a magnetic tape to reproduce said recorded image signals;

a control head for reproducing a control signal which is recorded on said magnetic tape correspondingly to each track;

a traced-azimuth predicting means for generating an azimuth change over signal on a basis of said control signal as a time reference after reproducing of said control signal, said azimuth change over signal including n signals (where n is a positive integer number other than zero) which correspond to the azimuth angles of the respective recording tracks, said n signals being produced during a term wherein it is repeated n times that one recording track is traced by the azimuth head; and switching means for selecting one image signal from among the image signals reproduced by said first and second pairs of azimuth heads in accordance with said n signals of azimuth change over signal.

4. A magnetic recording and reproducing unit of a helical scan type according to claim 3, wherein the running speed of said slow speed running mode is different from the running speed at the time of recording image signals.

5. A magnetic recording and reproducing unit of a helical scan type according to claim 3, further including means for inserting an added vertical synchronizing signal into said selected image signal, and said means for inserting an added vertical synchronizing signal has means for generating two of said added vertical synchronizing signals having a phase difference corresponding to a time difference between reproduced image signals of said pair of azimuth heads, and selecting means for selectively outputting one of said two added vertical synchronizing signals in response to the fact that an azimuth head has been changed over to the azimuth head that has said phase difference.

6. A magnetic recording and reproducing unit of a helical scan type according to claim 5, wherein said means for inserting said added vertical synchronizing signal further has means for varying the phase of an added vertical synchronizing signal that has been selected by said selecting means.

7. A magnetic recording and reproducing unit of a helical scan type according to claim 3, further including an intermittent recording and reproducing unit.

8. A magnetic recording and reproducing unit of a helical scan type according to claim 3, further including an image signal recording unit.

9. A magnetic recording and reproducing unit of a helical scan type according to claim 3, wherein said traced azimuth predicting signal generating means has a plurality of change over patterns of mutually different phases and has selecting means for selecting said change over patterns from the outside and outputting a selected pattern as said change over signal.

10. A magnetic recording and reproducing unit of a helical scan type according to claim 3, wherein said traced azimuth predicting signal generating means has a plurality of said change over patterns of mutually different phases and sequentially uses a plurality of change over patterns as said change over signal to select reproduced image signals from said pair of azimuth heads, and said magnetic recording and reproducing unit further includes means for detecting envelope levels of said selected reproduced image signals, means for detecting a maximum value and a minimum value for each of said envelope levels, means for calculating a difference between said maximum value and minimum value for each case of a plurality of said change over signals, and means for deciding said change over signal for obtaining a reproduced image signal of which difference between said maximum value and minimum value is the smallest.

11. A magnetic recording and reproducing unit of a helical scan type, comprising:

a first pair of azimuth heads having mutually different azimuth angles, which are mutually adjacently disposed on the outer periphery of a rotating cylinder;

a second pair of azimuth heads having mutually different azimuth angles, which are mutually adjacently disposed at positions symmetrical with said first pair of azimuth heads with respect to a rotating center of said rotating cylinder, each of said first and second pairs of azimuth heads alternately tracing tracks recorded with image signals on a magnetic tape to reproduce said recorded image signals;

a control head for reproducing a control signal which is recorded on said magnetic tape correspondingly to each track;

a traced-azimuth predicting means for generating an azimuth change over signal in response to said control signal;

said azimuth change over signal including n signals (where n is a positive integer number other than zero) which correspond to the azimuth angles of the respective recording tracks, said n signals being produced during a term wherein it is repeated n times that one recording track is traced by the azimuth head;

a switching means for selecting one image signal from among the image signals reproduced by said first and second pairs of azimuth heads in accordance with said n signals of azimuth change over signal; and said azimuth change over signal having a period synchronized with the term wherein it is repeated n times that the azimuth head completes tracing one recording track from a start of tracing the recording track by the azimuth head after detection of said control signal to a start of tracing said recording track by the azimuth head after detection of a next control signal; and said switching means selecting said one image signal in said period of said azimuth change over signal.

* * * * *